United States Patent
Ren et al.

(10) Patent No.: US 12,456,754 B2
(45) Date of Patent: Oct. 28, 2025

(54) PROCESS AND SYSTEM FOR PRODUCING LIPF[6], AND MIXTURE CRYSTAL, COMPOSITION, ELECTROLYTE SOLUTION, AND LITHIUM BATTERY CONTAINING LIPF[6]

(71) Applicants: Sinochem Lantian Co., Ltd., Hangzhou (CN); Zhejiang Zhonglan New Energy Materials Co., Ltd., Huzhou (CN); Zhejiang Research Institute of Chemical Industry Co., Ltd., Hangzhou (CN)

(72) Inventors: Jiangang Ren, Hangzhou (CN); Haibing Zhang, Hangzhou (CN); Xiaohong Ma, Hangzhou (CN);

(Continued)

(73) Assignees: SINOCHEM LANTIAN CO., LTD, Hangzhou (CN); ZHEJIANG ZHONGLAN NEW ENERGY MATERIALS CO., LTD., Huzhou (CN); ZHEJIANG RESEARCH INSTITUTE OF CHEMICAL INDUSTRY CO., LTD, Zhejiang (CN)

( * ) Notice: Subject to any disclaimer, the term of this patent is extended or adjusted under 35 U.S.C. 154(b) by 680 days.

(21) Appl. No.: 17/783,951

(22) PCT Filed: Dec. 9, 2020

(86) PCT No.: PCT/CN2020/134848
§ 371 (c)(1),
(2) Date: Jun. 9, 2022

(87) PCT Pub. No.: WO2021/115316
PCT Pub. Date: Jun. 17, 2021

(65) Prior Publication Data
US 2023/0007900 A1    Jan. 12, 2023

(30) Foreign Application Priority Data

Dec. 10, 2019   (CN) .......................... 201911254922.4
Dec. 10, 2019   (CN) .......................... 201911254953.X
(Continued)

(51) Int. Cl.
H01M 10/0568   (2010.01)
H01M 10/052    (2010.01)
(Continued)

(52) U.S. Cl.
CPC ..... H01M 10/0568 (2013.01); H01M 10/052 (2013.01); H01M 10/0567 (2013.01);
(Continued)

(58) Field of Classification Search
CPC ........... H01M 10/0568; H01M 10/052; H01M 10/0567; H01M 10/0569;
(Continued)

(56) References Cited

U.S. PATENT DOCUMENTS

2020/0295404 A1*   9/2020   Woo .................. H01M 10/0568

FOREIGN PATENT DOCUMENTS

CN   101544361 A  *  9/2009
CN   106745096 A  *  5/2017  ........... C01B 25/455

OTHER PUBLICATIONS

Liu et al., CN 106745096 A; Espacenet machine translation, 2017 (Year: 2017).*

(Continued)

*Primary Examiner* — Adam A Arciero
(74) *Attorney, Agent, or Firm* — MUNCY, GEISSLER, OLDS & LOWE, P.C.

(57) ABSTRACT

Disclosed are a process and continuous system for producing $LiPF_6$, and a prepared mixture crystal, composition, electrolyte solution and lithium ion battery containing (Continued)

LiPF$_6$. During preparation, a first feed stream containing PF5 and a second feed stream containing LiF and HF are introduced into a first microchannel reactor, a gas part of a product in the first microchannel reactor is introduced into a second microchannel reactor to react with a third feed stream containing LiPF$_6$, LiF and HF, and a liquid part of the product in the first microchannel reactor is subjected to crystallization and drying to obtain LiPF$_6$. The LiPF$_6$ has the advantages of a high purity, a uniform particle size, a high product quality stability, etc., and is suitable for use as a component of an electrolyte solution of a lithium ion battery.

8 Claims, 3 Drawing Sheets

(72) Inventors: Guoqiang Ma, Hangzhou (CN); Haidao Liu, Hangzhou (CN); Qing Yang, Hangzhou (CN); Jingbo Dong, Hangzhou (CN); Huichuang Chen, Hangzhou (CN); Qi Zhang, Hangzhou (CN); Nan Sheng, Hangzhou (CN)

(30) Foreign Application Priority Data

Dec. 10, 2019 (CN) .......................... 201911254957.8
Dec. 10, 2019 (CN) .......................... 201911254959.7
Dec. 10, 2019 (CN) .......................... 201911254960.X
Dec. 10, 2019 (CN) .......................... 201911255090.8

(51) Int. Cl.
*H01M 10/0567* (2010.01)
*H01M 10/0569* (2010.01)

(52) U.S. Cl.
CPC .................. *H01M 10/0569* (2013.01); *H01M 2300/0037* (2013.01); *H01M 2300/0051* (2013.01)

(58) Field of Classification Search
CPC . H01M 2300/0037; H01M 2300/0051; H01M 10/0525; C01D 15/005; C01P 2002/52; C01P 2004/60; C01P 2006/10; C01P 2006/80; C01P 2006/82
See application file for complete search history.

(56) References Cited

OTHER PUBLICATIONS

Han et al., CN 101544361 A; Espacenet machine translation, 2009 (Year: 2009).*

* cited by examiner

PROCESS AND SYSTEM FOR PRODUCING LIPF[$_6$], AND MIXTURE CRYSTAL, COMPOSITION, ELECTROLYTE SOLUTION, AND LITHIUM BATTERY CONTAINING LIPF[$_6$]

FIELD OF THE INVENTION

The present invention relates to the technical field of new energy, specifically to the field of electrolyte solution of lithium ion battery, in particular to the production method, equipment, continuous system, prepared products and uses of $LiPF_6$.

BACKGROUND OF THE INVENTION

Lithium hexafluorophosphate ($LiPF_6$) is a white crystalline powder, which is the main component of commercial lithium ion battery electrolyte solution. $LiPF_6$ enables batteries to have high energy density, high cycle capacity, low self-discharge rate, long shelf life, and excellent operational safety, which are the keys to battery performance. The lithium ion battery electrolyte solution has particularly high requirements on the purity of $LiPF_6$, and the impurity content thereof must be strictly controlled, otherwise the internal resistance of the battery will increase, the battery capacity will decay rapidly, and the safety will be reduced. However, it is very difficult to obtain high-quality $LiPF_6$ due to the difficulty and harsh conditions for the preparation of $LiPF_6$, and the specific properties of $LiPF_6$, such as low thermal stability, high hygroscopicity, and easy hydrolysis.

The preparation methods of $LiPF_6$ mainly include gas-solid reaction method, organic solvent method and HF solvent method, etc. At present, the mainstream method for preparing $LiPF_6$ at home and abroad is the HF solvent method, which accounts for more than 80% of all industrial production methods. Large-scale enterprises such as Japan's Morita Chemical, DFD Chemical, and Jiangsu Jiujiujiu have adopted this method to realize industrial production.

CN108640129A (Morita Chemical) discloses a preparation method of $LiPF_6$, including: (1), introducing PF5 gas into a reaction kettle that has been added with LiF and HF liquid to react for 1-2 hours, to obtain $LiPF_6$ solution; (2)), performing crystallization under stirring conditions; (3), drying.

CN101723346B (DFD Chemical) discloses a preparation method of $LiPF_6$, including: reacting phosphorus pentachloride with anhydrous HF to obtain a mixed solution of hexafluorophosphoric acid and anhydrous HF; then preparing an anhydrous HF solution of LiF; finally adding the anhydrous HF solution of LiF to the mixture of hexafluorophosphoric acid and anhydrous HF, to obtain a pure $LiPF_6$ product through reaction, crystallization, separation and drying.

CN106698384B (Jiangsu Jiujiujiu Technology) discloses a $LiPF_6$ production device. According to the disclosure, a $LiPF_6$ synthesis kettle is connected with a synthesis kettle transfer pump, and the synthesis kettle transfer pump is connected with an atomizing nozzle in a drying tower through a conveying pipe, and the tower wall of the drying tower is divided into multiple sections, and the temperature of the multi-section tower walls increases from top to bottom, the temperature of each section of the tower wall remains constant, and the top outlet of the drying tower is connected to the anhydrous HF condenser and PF5 reactor through a mass flow meter; the anhydrous HF condenser is connected with the anhydrous HF storage tank, and the anhydrous HF storage tank is connected with the $LiPF_6$ synthesis kettle; the PF5 reactor is connected with a gas buffer tank, the gas buffer tank is connected with the $LiPF_6$ synthesis kettle, and the $LiPF_6$ synthesis kettle is connected with a tail gas absorption device; the outlet at the bottom of the drying tower is connected with a screw conveyor, and the screw conveyor is connected with a dryer.

CN101544361A (Luoyang Sunland Chemical Co., Ltd.) discloses a continuous preparation process and device for $LiPF_6$. According to the disclosure, the anhydrous HF solution A and PF5 or the mixture B of PF5 and other gases with dissolved LiF are mixed with raw materials through the gas-liquid mixer 1 according to a ratio; after the raw material mixture enters a multistage tubular reactor 2, the multistage synthesis reaction is carried out; the multi-stage tubular reactor 2 is connected in series with thin tubes lined with fluoroplastics in a smooth transition, and the reaction product after multi-stage synthesis reaction enters gas-liquid separator 3, to remove the unreacted gas through separation; the liquid reaction product enters the post-mixing reactor 4 to carry out the subsequent mixing reaction, and further react with the PF5 gas B introduced additionally, to remove the trace unreacted LiF components that may exist in the solution, and realize the complete conversion of LiF; the fully reacted solution enters the mother liquor storage tank 5 for temporary storage, and then enters the evaporative crystallizer for evaporation, cooling, crystallization, filtration and drying to obtain $LiPF_6$ crystal with a purity of 99.9%. The patent adopts multi-stage reaction to achieve the purpose of fully mixing the reactants, so that the reaction can be basically completed in a long residence time and a sufficient contact process; the subsequent mixing reaction plays the role of final check, so that the trace amount of unreacted LiF can be contacted with the high-concentration PF5 gas to react, to realize the complete conversion of LiF and achieve the purpose of preparing high-purity $LiPF_6$. Although this patent is a continuous process, it adopts a traditional reactor type, the reaction residence time is long, the liquid reaction product is separated and removed the unreacted PF5 gas and then the PF5 gas is introduced again for the reaction, the utilization of raw materials is not sufficient, and the technological process is not reasonable enough, the cost is high, and the purity of the prepared $LiPF_6$ crystal is only 99.9%.

CN108147436A (Jiangsu NEWTAI Materials) discloses a synthesis method for improving synthesis efficiency and reducing unit consumption in the production process of $LiPF_6$, including the following steps: 1) gasifying HF into gaseous state; 2) converting gaseous HF into liquid state; 3) adding dropwise the obtained liquid HF in the step 2) to the reaction tank containing phosphorus pentachloride to carry out the reaction; 4) cooling the mixed gas obtained from the reaction in step 3) by adjoining pipe, and then introducing into a synthesis reaction kettle; 5) carrying out the synthesis reaction process in the synthesis reaction kettle by high-pressure liquid vacuum suction and efficient mixing; 6) introducing the tail gas discharged from the synthesis reaction kettle into the absorption reaction kettle; 7) cooling the tail gas discharged from the absorption reaction kettle with a condenser before water scrubbing and absorption.

CN1108985C (Hosei Co., Ltd.) discloses a preparation method of $LiPF_6$, using phosphorus pentachloride ($PCl_5$), lithium chloride (LiCl) and hydrofluoric acid (HF) as raw materials. The method comprises the following steps: (a) reacting phosphorus pentachloride with hydrofluoric acid to prepare PF5 (PF5), and (b) reacting PF5 with lithium chloride in a hydrofluoric acid solution to prepare $LiPF_6$.

The HF solvent method in the above patent documents all utilizes the reaction kettle and is a batch process; in addition, there are many production links, the process is complicated, the production efficiency is low, the equipment requirement is high and the cost is high.

A microchannel reactor refers to a microreactor with a feature size between 10 and 300 μm (or 1,000 μm) manufactured by precision machining technology. The microchannel reactor can contain millions of microchannels, so it can achieve high output. The microchannel reactor is initially studied by DuPont in the early 1900s, and presently it has been widely used in many chemical processes. However, microchannel reactors are still less used in the preparation of $LiPF_6$.

Only CN106745096A (Jiujiang Tianci) describes that PF5 gas and alkali metal fluoride salt solution are introduced into a microchannel reactor for mixing and reaction after metering, then the obtained reaction solution is subjected to crystallization and drying to obtain the alkali metal hexafluorophosphate salt. However, the highest yield of $LiPF_6$ product in this patent application is only 98.5%, and pure PF5 gas is used, the cost is high; moreover, the specific purity of $LiPF_6$ product and the method of improving the quality of $LiPF_6$ product are not disclosed.

Although a microchannel reactor is only a type of reactor, it can be used in many fields, but there are still many difficulties to overcome in specific applications. Different processes are used for different reaction types to achieve a balance between reaction efficiency, product quality and production cost, and achieve large-scale industrial production. Moreover, when $LiPF_6$ is applied to commercial lithium ion batteries in batches, the requirements for its purity, stability and consistency are very high.

SUMMARY OF THE INVENTION

According to a first aspect, the present invention provides a $LiPF_6$ preparation process and production system suitable for large-scale industrial continuous production. The prepared $LiPF_6$ has the advantages of high purity, uniform particle size, high product quality stability, etc., and is suitable as a component of an electrolyte solution of a lithium ion battery.

The technical solution of the present invention:

A process for producing $LiPF_6$, comprising: introducing a first feed stream containing PF5 and a second feed stream containing LiF and HF into a first microchannel reactor, introducing a gas part of a product in the first microchannel reactor into a second microchannel reactor to react with a third feed stream containing $LiPF_6$, LiF and HF, subjecting a liquid part of the product in the first microchannel reactor to crystallization and drying to obtain $LiPF_6$.

Further, the liquid part of the product in the second microchannel reactor can be added to the first microchannel reactor as a fourth feed stream.

Further, the first feed stream further comprises a mass transfer promoting component.

The mass transfer promoting component in the first feed stream is preferably HCl.

Further, the first feed stream further comprises HF.

The reaction temperature of the first microchannel reactor and the second microchannel reactor is preferably controlled at 0-17° C.

The residence time of the first microchannel reactor and the second microchannel reactor is preferably 5-120 seconds.

Further, the liquid part of the product in the first microchannel reactor enters the synthetic liquid tank for storage before entering the crystallization tank for crystallization.

Further, the drying is a process of drying and removing acid.

The production system adopted by the $LiPF_6$ process of the present invention comprises a first microchannel reactor, a second microchannel reactor, a crystallization tank and a drying system. The first microchannel reactor is in communication with the second microchannel reactor through a first gas-liquid separator, and a gas part of a product in the first microchannel reactor is introduced into the second microchannel reactor, the first microchannel reactor is in communication with the crystallization tank through the first gas-liquid separator and a synthetic liquid tank, the crystallization tank is connected with the drying system, and a liquid part of the product in the first microchannel reactor is subjected to crystallization and drying to obtain $LiPF_6$.

The crystallization tank is in communication with the second microchannel reactor through a mother liquor tank and a LiF dissolution tank. The second microchannel reactor is in communication with the first microchannel reactor through a second gas-liquid separator, the liquid part of the product in the second microchannel reactor is introduced into the first microchannel reactor, and the gas part of a product in the second microchannel reactor enters the separation system for separation and recycling.

The feed side of the first microchannel reactor is in communication with the PF5 generator, and the feed $PCl_5$ of the PF5 generator is provided by a solid conveyor.

In the present invention, the crystallization in the crystallization tank is $LiPF_6$ crystallization in a cooling state. After the solid crystals are filtered, drying and acid removal are carried out in the drying system. The filtered mother liquor is stored in the mother liquor tank, and the mother liquor contains $LiPF_6$ and HF. After the content of $LiPF_6$ in the mother liquor in the mother liquor tank is quantitatively determined, the mother liquor is delivered to the LiF dissolution tank for the preparation of quantitative LiF solution. The LiF solution is the third feed stream containing $LiPF_6$, LiF and HF entering the second microchannel reactor.

Preferably, in the present invention, the first feed stream containing PF5 is directly introduced into the first microchannel reactor after being generated from the PF5 generator, and there is no need of a separation process, and it is a continuous reaction. Preferably, the first feed stream containing PF5 also includes HCl, which is a mass transfer promoting component. In the first microchannel reactor, HCl is not involved in the reaction, and acts as a mass transfer promoting component to improve the mass transfer effect between the reactants, so that PF5 and LiF react fully and uniformly, and LiF reacts completely.

In the prior art, pure PF5 gas is prepared through a complex reaction and purification process, and then the pure PF5 gas is introduced into a microchannel reactor for the reaction. Compared with the prior art, in the present invention, all the products from the PF5 generator are directly introduced into the first microchannel reactor, which, on the one hand, reduces the cost of gas separation and purification, and on the other hand, improves the mass transfer and heat transfer effects, and avoids the blockage of microchannels, and realizes industrialized large-scale continuous production. Compared with the conventional reactor, the microchannel reactor of the present invention can not only realize continuous production, shorten the reaction time, improve the production efficiency, and improve the safety, but also can achieve a more complete reaction, higher product purity and more uniform particle size.

As mentioned above, the first feed stream also includes HF. The HF gas comes from the unreacted HF introduced into the PF5 generator. In the present invention, the feed streams entering the first and second microchannel reactors both include liquid or gaseous HF. The uniformity of feed stream mixing is high, and the reaction efficiency is improved.

In the present invention, the PF5 generator is provided with a cooling jacket, and the raw material PCl5 is conveyed through a solid conveyor with a metering device.

In the present invention, in the second feed stream containing LiF and HF, HF is an HF solution. The mass fraction of LiF in the second feed stream is 0.5-5.5% (wt).

In the present invention, the liquid part of the product in the second microchannel reactor contains LiF and $LiPF_6$.

In the present invention, the reaction temperature of the first microchannel reactor and the second microchannel reactor is controlled at 0-17° C., preferably 3-10° C., more preferably 5-7° C.

Preferably, the reaction temperatures of the first microchannel reactor and the second microchannel reactor are different. Further preferably, the reaction temperature of the second microchannel reactor is higher than that of the first microchannel reactor. Further preferably, the reaction temperature of the second microchannel reactor is 1-10° C. higher than the reaction temperature of the first microchannel reactor. Further preferably, the reaction temperature of the second microchannel reactor is 2-6° C. higher than that of the first microchannel reactor. Further preferably, the reaction temperature of the second microchannel reactor is 2-5° C. higher than that of the first microchannel reactor. Controlling the reaction temperatures of the first microchannel reactor and the second microchannel reactor within the above range can further improve the reaction efficiency and product purity.

As mentioned above, the residence time of the first microchannel reactor and the second microchannel reactor is preferably 5-120 seconds, more preferably 5-30 seconds, and still more preferably 10-20 seconds.

Preferably, the residence time of the first microchannel reactor and the second microchannel reactor are different. Further preferably, the residence time of the second microchannel reactor is longer than that of the first microchannel reactor. Further preferably, the residence time of the second microchannel reactor is 1-30 seconds longer than the residence time of the first microchannel reactor. Further preferably, the residence time of the second microchannel reactor is 2-20 seconds longer than the residence time of the first microchannel reactor. Further preferably, the residence time of the second microchannel reactor is 2-5 seconds longer than the residence time of the first microchannel reactor.

A gas part and a liquid part of the products in the first and second microchannel reactors are separated by a gas-liquid separator.

The gas part of the product in the first microchannel reactor includes HCl and unreacted PF5.

The liquid part of the product in the first microchannel reactor includes $LiPF_6$ and HF. In the crystallization tank, the $LiPF_6$ crystal with uniform particle size is obtained by controlling the cooling speed of the synthetic liquid and the stirring speed of the stirrer in the crystallization tank. Specifically, the cooling speed of the synthetic liquid is 1.5-5° C./h, preferably 1.5-3° C./h; the stirring speed of the stirrer is 0-50 rpm, preferably 40 rpm, more preferably 30 rpm. The temperature range for cooling the synthetic liquid is from 20-30° C. to −40-−48° C., and after cooling to −40-−48° C., the temperature is kept for 6 to 12 hours, and then filtered and dried.

The gas part of the product in the second microchannel reactor includes HCl and entrained HF. The HCl is further separated by the separation system. The separated HCl can be prepared into industrial hydrochloric acid, which reduces the treatment capacity of the three wastes; the separated HF can be recycled, and the HF consumption is reduced.

In order to reduce the insoluble substance encapsulated in the $LiPF_6$ product and improve the product purity, LiF in the first microchannel reactor of the present invention is completely reacted, and PF5 in the second microchannel reactor is completely reacted. Therefore: The molar ratio of PF5 to LiF in the first microchannel reactor is (2-5):1, preferably (2.5-4):1. The molar ratio of PF5 to LiF in the second microchannel reactor is 1:(1-2), preferably 1:(1.1-1.3), more preferably 1:(1.15-1.25).

In the present invention, the mass fraction of $LiPF_6$ in the product stream of the first microchannel reactor is 15-25% (wt), preferably 18-22% (wt), more preferably 19-20% (wt). The mass fraction of $LiPF_6$ in the third feed stream in the second microchannel reactor is 0-15% (wt), preferably 0-12% (wt), more preferably 0-10% (wt).

The $LiPF_6$ crystal prepared by the process of the present invention has a high purity of more than 99.99% (wt), and the crystal particles have uniform particle size, and the particle size of more than 80% (wt) of crystal particles is 0.2-0.3 mm, and the particle size of more than 90% (wt) of crystal particles is 0.18-0.35 mm. Preferably, the purity is up to above 99.995% (wt), the crystal particles have uniform particle size, the particle size of above 83% (wt) of crystal particles is 0.2-0.3 mm, and the particle size of above 94% (wt) of crystal particles is 0.18-0.35 mm.

The crystal particles of the present invention are moderate in particle size, high in product stability, high in consistency and high in purity, and the lithium ion battery prepared as an electrolyte solution component has excellent performance.

When the $LiPF_6$ crystal of the present invention is used to prepare the electrolyte solution, the mass percentage of the $LiPF_6$ crystal in the electrolyte solution is preferably 5-20 wt %. Preferably, the electrolyte solution also includes $LiPO_2F_2$ and $LiBF_2C_2O_4$. Preferably, the mass ratio of $LiPF_6$:$LiPO_2F_2$:$LiBF_2C_2O_4$ is (50-90):(5-40):(5-30), more preferably, (55-85):(10-30):(10-25). The electrolyte solution also includes 1,2-Bis(trifluoromethyl)benzene, and the mass percentage of 1,2-Bis(trifluoromethyl)benzene in the electrolyte solution is 0.1-3 wt %. The electrolyte solution may also include ethylene carbonate, ethyl methyl carbonate and diethyl carbonate. The total mass percentage of ethylene carbonate, ethyl methyl carbonate and diethyl carbonate in the electrolyte solution is 70-90 wt %, and the mass ratio of ethylene carbonate, ethyl methyl carbonate and diethyl carbonate is (2.5-3.5):(4.5-5.5):(1.5-2.5). The electrolyte solution prepared by the $LiPF_6$ crystal of the present invention has the advantages of higher stability, better durability, better battery cycle performance, etc.

In the present invention, the $LiPF_6$ crystal with high purity, high uniformity and moderate particle size is prepared by introducing mass transfer promoting components into two microchannel reactors, controlling operating conditions and combing with a specific crystallization process. The process of the present invention enables complete reaction of raw materials, without wastes; in addition, the production cost is low, the equipment investment is small, and the production efficiency is high, and the yield is up to 99.6%, so the process is suitable for industrial large-scale continuous production.

According to a second aspect, the present invention provides a continuous system for producing $LiPF_6$ based on a microchannel reactor, which utilizes a reverse cycle way to fully utilize and convert reaction raw materials, and designs a separation and recovery device during the process, to reduce the consumption of raw materials.

Microchannel reactors are generally manufactured by micromachining and precision machining technology, which is characterized by having a fluid flow channel with an equivalent diameter between micrometers and millimeters. The specific size can be selected according to the physical state, chemical properties and chemical reaction conditions of the reaction raw materials, and the height and width are perpendicular to the direction of fluid flow. The length of the reaction chamber is usually longer and can be selected according to production needs. The microchannel reactor of the present invention includes a direct flow channel structure or an enhanced mixed channel structure, the direct flow channel structure is a tubular structure, and the cross section of the enhanced mixed channel structure can be of any shape, for example, including but not limited to the following shapes: T shape, Z shape, V shape, S shape, spherical structure, hemispherical structure, spherical baffled structure, droplet structure, funnel structure, triangular structure, heart structure or umbrella structure, and the equivalent diameter of the channel is 0.5 mm-10 mm, preferably 1.5 mm-3 mm, and the liquid holding volume is 10-4000 ml, preferably 25-50 ml.

There are thousands of microchannels in the microchannel reactor, leading to a large specific surface area, which can be hundreds or even thousands of times the specific surface area of a common reactor, so the microchannel reactor has excellent heat and mass transfer capabilities, and the optimal heat transfer coefficient can reach 1700 kW/($m^2 \cdot K$). The reactants in the microchannel can conduct efficient heat exchange with the wall surface, the temperature uniformity is good, and the reaction bed is close to a constant temperature, so that the heat released by the reaction of LiF in the PF5 and HF solution can be conducted in a timely and efficient manner and absorbed instantly, thus ensuring that $LiPF_6$ will not be thermally decomposed to form an insoluble substance due to the reaction heat. The reaction temperature fluctuates slightly and stably, which is conducive to the smooth progress of the chemical reaction.

In the process of preparing $LiPF_6$ using conventional equipment such as reaction tanks, HF is easily attached to the surface of $LiPF_6$ to generate $LiPF_6 \cdot HF$ that is difficult to remove, resulting in high free acid content in the product, which has become a major problem in production. In the present invention, due to the use of microchannel reactor, the reaction speed is fast, the reaction time is short, the reaction time of the reactants in the reactor is 5-120 seconds, which is greatly shortened compared with the reaction time in the conventional reaction, which is between 1 hour and 10 hours. In addition, the reactants containing HF enter the reactor in a continuous state, and the reaction product containing $LiPF_6$ is delivered out of the reactor in a continuous state. The residence time of the reaction material HF and the product $LiPF_6$ in the reactor is short, and the mutual interference is small, that is, the possibility of contact and reaction of the product $LiPF_6$ with the reactant HF is reduced, thereby effectively inhibiting the occurrence of side reactions between $LiPF_6$ and HF and achieving the purpose of reducing free acids of the product.

The small channel size of microchannel reactors is an important safety factor, since the expansion of the flame is suppressed in the microchannel reactors. Therefore, this type of reactors can be operated in the explosive range and there is no need of any additional special safety measures. When a microchannel reactor is applied to the preparation of $LiPF_6$ by the hydrofluoric acid solvent method, although there is no problem of suppressing the flame, it can reduce the hidden danger of accidents, reduce the harm of accidents, and also improve the safety performance of the operation.

Various sides of the reaction channel of the microchannel reactor are defined by the walls of the reaction channel. These walls can be made of a hard material to ensure durability, corrosion resistance, high temperature resistance (200° C.), high pressure resistance (100 bar) and good thermal conductivity. The hard material is optionally metal, metal alloy, silicon carbide, preferably the hard material is stainless steel, Monel alloy, nickel-based alloy, Hastelloy or silicon carbide.

A continuous system is adopted to avoid the leakage of additional equipment and transfer in conventional batch reactions, and the safety is improved. Anhydrous HF is a high-risk chemical. LiF is dissolved in HF to carry out a series of reactions, and the crystallization, separation and drying of the LiF are relatively dangerous. At the same time, $LiPF_6$ products are extremely sensitive to water and are easy to absorb moisture and hydrolyze, so it is extremely important to ensure that the operation is performed in an anhydrous environment. This requires the equipment to have good sealing during the entire process. The continuous production system is easy to realize operations in a sealed state, and is conducive to improving the production efficiency.

The present invention adopts two groups of microchannel reactors, which are respectively the first microchannel reactor (3) and the second microchannel reactor (6), to ensure the sufficient reaction of the raw materials by means of reverse circulation. For conventional connection in series of two groups of microchannel reactors, usually the output stream $A_{output}$ of the first microchannel reactor (3) is directly used as the input stream of the second microchannel reactor (6), which prolongs the residence time of the reactants in the reactor, the content of the reaction product increases and the content of the reactants in the reactant stream decreases, which cannot make the reactant LiF react completely or PF5 react completely, but will make the residual reactant LiF in the reaction product, thus, the product purity cannot be guaranteed and the incompletely reacted PF5 enters the gas post-processing system with HCL gas, and is absorbed and processed by water, resulting in high consumption of raw materials. In the present invention, the output stream of the first microchannel reactor (3) is transported to the gas-liquid separator A (4) for gas-liquid separation, and the liquid therein, that is, the component containing $LiPF_6$, is transported to the synthetic liquid tank (5) for storage. The separated gas contains unreacted PF5 and entrained HF and HCl components, and is transported to the second microchannel reactor (6). The second microchannel reactor (6) at least contains two feed streams: one is the gas separated by the gas-liquid separator A (4), which contains unreacted PF5 and the entrained HF and HCl components, and the other is the HF solution with LiF and $LiPF_6$ dissolved. PF5 and LiF react to form $LiPF_6$. Thus, the two groups of microchannel reactors used in the present invention are not simply connected in series, and the effect is not a simple superposition of the two groups of microchannel reactors, but the chemical reaction properties of the raw materials and products are combined, the input raw material stream of the second microchannel reactor (6) is adjusted, thereby the purpose of controlling side reactions, improving the utilization rate of raw materials and improving product purity is realized.

The continuous system includes a PF5 generator (2), a first microchannel reactor (3), a gas-liquid separator A (4), a second microchannel reactor (6), and a gas-liquid separator B (7). The gas containing $PCl_5$ and HF solution with dissolved LiF are used as raw materials to carry out the reverse cycle reaction, the gas generated by the PF5 generator (2) is introduced into the microchannel reactor A (3), and the output material of the first microchannel reactor (3) enters the gas-liquid separator A (4), the gas separated by the gas-liquid separator A (4) enters the second microchannel reactor (6) as the reaction raw material to continue the reaction, and the output material of the second microchannel reactor (6) enters the gas-liquid separator B (7), and the liquid components separated by the gas-liquid separator B (7) are transported to the first microchannel reactor (3).

In order to reduce the insoluble substance encapsulated in the $LiPF_6$ product and improve the product purity, LiF in the first microchannel reactor of the present invention is completely reacted, and PF5 in the second microchannel reactor is completely reacted. Therefore:

The first microchannel reactor (3) contains at least two feed streams: one is HF solution with dissolved LiF; the other is mixed gas PF5, HCl and entrained HF gas. Further preferably, the excess of PF5 raw material in the first microchannel reactor (3) is controlled to ensure sufficient conversion of the reaction raw material LiF, and the molar ratio of PF5 to LiF in the first microchannel reactor (3) is preferably (2-5):1, more preferably (2.5-4):1.

The microchannel reactor B (6) contains at least two feed streams: one is the gas separated by the gas-liquid separator A (4), which contains unreacted PF5 and the entrained HF and HCl components, and the other is the HF solution with LiF and $LiPF_6$ dissolved. The conversion rate can be further improved by adjusting the ratio of raw materials in the second microchannel reactor (6). Preferably, the excess of raw material LiF in the second microchannel reactor (6) is controlled to ensure sufficient conversion of the reaction raw material PF5. Preferably, the molar ratio of PF5 and LiF in the second microchannel reactor (6) is 1:(1-2), more preferably 1:(1.1-1.3), still more preferably: 1:(1.15-1.25).

Further preferably, the first microchannel reactor (3) contains a third feed stream: the liquid component separated by the gas-liquid separator B (7), and the separated liquid contains $LiPF_6$ and unreacted LiF.

Further preferably, the output material of the first microchannel reactor (3) enters the gas-liquid separator A (4), and the liquid mixture material separated by the gas-liquid separator A (4) enters the synthetic liquid tank (5) and the crystallization tank (9) successively for the crystallization of $LiPF_6$, and the mother liquor after crystallization and filtration is stored in the mother liquor tank (11). After the content of $LiPF_6$ in the mother liquor in the mother liquor tank (11) is quantitatively determined by analysis, it is sent to the LiF dissolution tank (12) for the preparation of quantitative LiF solution. The HF solution containing $LiPF_6$ dissolves a quantitative amount of LiF and then is transported to the second microchannel reactor (6) for reaction, that is, the second microchannel reactor (6) contains a third feed stream: the HF solution containing $LiPF_6$ after crystallization and filtration.

To sum up, the present invention utilizes the good heat transfer performance of the microchannel reactor, so that the reaction time is shortened from several hours to dozens of seconds to several minutes, the efficiency is significantly improved, and the safety of the anhydrous hydrofluoric acid reaction is guaranteed; A continuous system, which is easy to realize operation in a sealed manner, is adopted to avoid the leakage of additional equipment and transfer in conventional batch reactions, and is conducive to improving production efficiency; reverse circulation is adopted to recycle raw materials and by-products, and further adjust the ratio of the reaction raw materials, promote the complete reaction of raw materials, and improve the conversion rate of the raw materials, and reduce the cost of the raw materials; the HF and HCl separation system is set up to fully separate HF and HCl, reducing the treatment of mixed acids; in addition, the industrial hydrochloric acid can be prepared, and the hydrochloric HF can be recycled, lowing the consumptions of raw materials and the costs for treatment of "three wastes".

The $LiPF_6$ produced by the present invention can be used in various fields, and optionally, can be used as the electrolyte solution component of lithium ion battery as described above.

According to the third aspect, the present invention provides a mixture crystal with uniform particle size distribution, high consistency, and high $LiPF_6$ content and a preparation method thereof. The specific technical solutions are as follows:

A mixture crystal containing $LiPF_6$, the aspect ratio of the mixture crystal containing $LiPF_6$ is 1-1.5, the average particle size of the crystal is 0.15-0.4 mm, and in more than 90% of the crystal particles, the family of crystal planes {110} accounts for 20-80%, the family of crystal planes {111} accounts for 20-80%, and the mixture crystal also contains insoluble substance and free acid. The proportions of the above family of crystal planes{110} and family of crystal planes{111} are respectively the proportions of the family of crystal planes{110} and family of crystal planes{111} in all the crystal planes of the crystal particle in a single crystal particle.

Wherein, the content of the insoluble substance is less than 200 ppm, and the content of the free acid (calculated as hydrofluoric acid) is less than or equal to 90 ppm.

The aspect ratio of the mixture crystal may preferably be 1 to 1.3.

The particle size of more than 68% (wt) of the mixture crystal is 0.2-0.3 mm, the size of more than 80% (wt) of the mixture crystal is 0.18-0.35 mm; preferably, the particle size of more than 80% (wt) of the mixture crystal is 0.2-0.3 mm, and the particle size of more than 90% (wt) of the mixture crystal is 0.18-0.35 mm.

Among the more than 80% (wt) of the mixture crystal, the family of crystal planes{110} accounts for 40-60%, and family of crystal planes{111} accounts for 40-60%.

The angle of repose of the mixture crystal is 20-40°, more preferably 20-30°.

The bulk density of the mixture crystal is 1.3-1.8 g/mL, more preferably 1.5-1.8 g/mL.

The mass percentage of $LiPF_6$ in the mixture crystal is 99.90-99.995%, preferably 99.95-99.995%. Further preferably, the mass percentage of $LiPF_6$ in the mixture crystal is 99.99-99.995%.

The mixture crystal also includes water, sulfate, chloride, metal ions, wherein, the metal ions include Na, K, Ca, Mg, Fe, Ni, Cr, Cu, Pb, water<20 ppm, sulfate (calculated as sulfate radical)<5 ppm, chloride (calculated as chloride ion)≤2 ppm, metal ions respectively <1 ppm, and the metal ions include Na, K, Ca, Mg, Fe, Ni, Cr, Cu, Pb.

The aspect ratio of the crystal can be understood as the ratio of the longest diameter passing through the inside of the crystal to the longest diameter perpendicular to the crystal. The aspect ratio reflects the consistency of the crystal particles to a certain extent. The range of the aspect ratio of the mixture crystal containing $LiPF_6$ of the present invention is small, and the consistency of crystal particles is high.

The mixture crystal containing $LiPF_6$ of the present invention has small crystal particle size and uniform distribution, and high $LiPF_6$ content, which is conducive to the dissolution in the electrolyte solution, and the dissolution exotherm is small and uniform.

The family of crystal planes in the present invention can be understood as all crystal planes in which atoms, ions or molecules are arranged exactly the same. The mixture crystal of the present invention contains $LiPF_6$ has consistent crystallization tendency, uniform crystal morphology and good consistency.

The angle of repose in the present invention can be understood as the maximum angle measured when the particles slide on the free slope of the powder accumulation layer in the gravitational field, and the gravity and the force of friction between the particles reach a balance and are in the static state. The smaller the angle of response is, the smaller the friction is, and the better the fluidity is.

The mixture crystal containing $LiPF_6$ of the present invention has high bulk density, small angle of repose, good fluidity, is not easy to agglomerate into a block, is easy to operate and control in the production of electrolyte solution, and is easy to control the heat of dissolution during the dissolution process.

The above mixture crystal of the present invention can be prepared by the aforementioned method, microchannel reactor and continuous system, using the stream containing PF5 and the stream containing LiF and HF as raw materials, and a continuous reverse cycle reaction is performed in a first microchannel reactor and a second microchannel reactor.

Specifically, the first feed stream containing PF5 and the second feed stream containing LiF and HF are introduced into the first microchannel reactor, a gas part of a product in the first microchannel reactor is introduced into the second microchannel reactor to react with the third feed stream containing $LiPF_6$, LiF and HF, and the liquid part of the product in the first microchannel reactor is subjected to crystallization and drying to obtain $LiPF_6$. The liquid part of the product in the second microchannel reactor can enter the first microchannel reactor as a fourth feed stream, by such reverse cycle reaction, the raw materials and by-products are fully recycled.

After the solid crystals are filtered, drying and acid removal are carried out in the drying system. The filtered mother liquor is stored in the mother liquor tank, and the mother liquor contains $LiPF_6$ and HF. After the content of $LiPF_6$ in the mother liquor in the mother liquor tank is quantitatively determined, the mother liquor is delivered to the LiF dissolution tank for the preparation of quantitative LiF solution. The LiF solution is the third feed stream containing $LiPF_6$, LiF and HF entering the second microchannel reactor.

The reaction temperature of the first microchannel reactor and the second microchannel reactor is 0-17° C., preferably 3-10° C., for example, 4° C., 5.5° C., 7° C., 8° C., 9° C., 9.5° C., and more preferably 5-7° C.

The residence time of the first microchannel reactor and the second microchannel reactor is 5-120 s, preferably 5-30 s, more preferably 5-25 s.

The mixture crystal containing $LiPF_6$ is prepared by the method of continuous reverse circulation of the present invention, wherein the contents of impurities such as insoluble substance, water, HF, and metals are strictly controlled, especially by controlling the reaction conditions such as reaction temperature, reaction time, and reaction material ratio in different microchannel reactors, the contents of insoluble substance and HF can be further controlled below 70 ppm and 20 ppm, respectively.

The mixture crystal containing $LiPF_6$ prepared in the present invention has high purity, low impurity content, and meets the requirements of industry standards; the crystal particle size is small, the particle size distribution is uniform, the crystal consistency is good, and the crystal fluidity is good, which is conducive to the dissolution of the crystal in the electrolyte solution. The exotherm of dissolution is small and uniform, the electrolyte solution prepared from the crystal of the present invention has high electrochemical performance, good cycle performance, long service life and high rate performance, and can meet the requirements of high-rate charge and discharge of batteries.

According to the fourth aspect, the present invention provides a composition comprising a $LiPF_6$ crystal and water; the $LiPF_6$ crystal has uniform particle size distribution, high consistency, low water content and high product quality stability, and is suitable as a component of an electrolyte solution of a lithium ion battery.

The technical solutions of the present invention:

A composition, comprising a $LiPF_6$ crystal and water; the $LiPF_6$ crystal particle size distribution is uniform, the particle size of 35-50% (wt) of crystals is greater than or equal to 0.2 mm, less than 0.25 mm, the particle size of 35-50% (wt) of the crystals is greater than or equal to 0.25 mm, less than or equal to 0.3 mm, the water content of the composition is less than 8 ppm.

Preferably, the particle size of 40-50% (wt) of crystals is greater than or equal to 0.2 mm and less than 0.25 mm, and the particle size of 40-50% (wt) of crystals is greater than or equal to 0.25 mm, and less than or equal to 0.3 mm.

Preferably, the particle size of 45-50% (wt) of crystals is greater than or equal to 0.2 mm and less than 0.25 mm, and the particle size of 45-50% (wt) of crystals is greater than or equal to 0.25 mm, and less than or equal to 0.3 mm.

The composition is prepared using a microchannel reactor. It can be prepared by the aforementioned methods, microchannel reactor and continuous system. There are two microchannel reactors. A gas part of a product in the first microchannel reactor enters the second microchannel reactor, and a liquid part of the product in the second microchannel reactor enters the first microchannel reactor.

The water content in the composition of the present invention is preferably less than 7 ppm, more preferably less than 6 ppm, 5 ppm, 4 ppm, 3 ppm, 2 ppm, and 1 ppm. The $LiPF_6$ crystal content in the composition of the present invention is as high as 99.99% (wt) or more. Crystal particles have uniform and moderate particle size. The product of the present invention has high stability, high consistency, high purity, and low water content, and the lithium ion battery prepared as an electrolyte solution component has excellent performance.

In the Anhydrous Hydrogen Fluoride for Industrial Use (GB 7746-2011), the water content of Class I anhydrous HF is less than or equal to 50 ppm. However, the water content of 50 ppm still cannot meet the requirements of high-purity and low-water content $LiPF_6$ products for raw material properties. In the production of $LiPF_6$, the presence of water will increase by-products, reduce the content of $LiPF_6$ in the product, and increase impurities.

For the anhydrous HF of the present invention, the water content is controlled by the F2 foaming method. The foaming time is 0.5-5 hours, the temperature is −15−−30° C., and the F2 flow rate is 2 to 800 g/hr. F2 reacts with water in HF to generate HF and oxygen difluoride gas (OF2). OF2 has a very low boiling point (−145° C.) and is easily volatilized and removed after the reaction.

The water content of anhydrous HF after the foaming treatment of the present invention is less than 10 ppm, preferably less than 8 ppm, more preferably less than 5 ppm, 2 ppm, and 1 ppm.

The F2 foaming method of the present invention can be used to thoroughly remove water in HF; compared with the conventional method such as rectification, the method has lower requirements on equipment, lower cost, simple process and better effect.

When producing the composition of the present invention, the reaction temperature of the first microchannel reactor and the second microchannel reactor is controlled at 0-17° C. The residence time of the first microchannel reactor and the second microchannel reactor is 5-120 seconds. The liquid part of the product in the first microchannel reactor enters the synthetic liquid tank for storage before entering the crystallization tank for crystallization. The liquid part of the product in the first microchannel reactor is subjected to crystallization and drying to obtain composition, and the drying is a process of drying and removing acid.

Heat treatment process after drying: The dried product is supplied to a heating furnace, and heat treatment is performed in the heating furnace, and a composition including higher-purity $LiPF_6$ crystal particles can be obtained. The interior of the heating furnace is vacuumized and sealed with PF5 gas, the heating time is 1-3 hours, the temperature is 85-100° C., the pressure is atmospheric pressure, after cooled to room temperature, the interior of the container is vacuumized to obtain the composition.

In the present invention, the composition with high purity of $LiPF_6$ crystal, high uniformity and moderate particle size and low water content is prepared by introducing mass transfer promoting components into two microchannel reactors, controlling operating conditions and combining the precise control of water in anhydrous HF raw materials and a specific crystallization and drying processes. The process of the present invention enables complete reaction of raw materials, without wastes; in addition, the production cost is low, the equipment investment is small, and the production efficiency is high, and the yield is up to 99.6%, so the process is suitable for industrial large-scale continuous production.

The composition of the present invention has excellent performance when used as a component of an electrolyte solution of a lithium ion battery, and has the advantages of higher stability, better durability, better battery cycle performance, etc.

According to the fifth aspect of the present invention, in order to improve the performance of the non-aqueous electrolyte solution and to solve the problems of poor high temperature cycle performance and high temperature storage performance of the non-aqueous electrolyte solution in the prior art, the present invention provides a non-aqueous electrolyte solution for a secondary lithium battery and a secondary lithium battery, so as to improve the performance of the secondary lithium battery and further improve the cycle performance and storage performance of the secondary lithium battery under a high temperature.

In order to achieve the above object, the present invention provides a non-aqueous electrolyte solution, comprising: a lithium salt and an organic solvent; the lithium salt is a mixture crystal containing $LiPF_6$, the aspect ratio of the mixture crystal is 1-1.5, and the average particle of the crystal is 0.15-0.4 mm, in more than 90% of the crystals, the family of crystal planes{110} accounts for 20-80%, the family of crystal planes{111} accounts for 20-80%, the mixture crystal also contains insoluble substance and free acid. The proportions of the above family of crystal planes{110} and family of crystal planes{111} are respectively the proportions of the family of crystal planes{110} and family of crystal planes{111} in all the crystal planes of the crystal particle in a single crystal particle.

In the non-aqueous electrolyte solution of the present invention, the concentration of $LiPF_6$ is 0.6-2 mol/L, preferably 0.9-1.4 mol/L.

Wherein, in the mixture crystal, the content of the insoluble substance is less than 200 ppm, and the content of the free acid (calculated as hydrofluoric acid) is less than 90 ppm.

The aspect ratio of the mixture crystal may preferably be 1 to 1.3.

The particle size of more than 68% (wt) of the mixture crystal is 0.2-0.3 mm, and the average particle size of more than 80% (wt) of the mixture crystal is 0.18-0.35 mm.

Among more than 80% (wt) of the mixture crystal, the family of crystal planes{110} accounts for 40-60%, and family of crystal planes{111} accounts for 40-60%.

The angle of repose of the mixture crystal is 20-40°, more preferably 20-30°.

The bulk density of the mixture crystal is 1.3-1.8 g/mL, more preferably 1.5-1.8 g/mL.

The mass percentage of $LiPF_6$ in the mixture crystal is 99.90-99.995%, preferably 99.95-99.995%. Further preferably, the mass percentage of $LiPF_6$ in the mixture crystal is 99.99-99.995%.

The mixture crystal also includes water, sulfate, chloride, metal ions, wherein, the metal ions include Na, K, Ca, Mg, Fe, Ni, Cr, Cu, Pb, water<20 ppm, sulfate (calculated as sulfate radical)<5 ppm, chloride (calculated as chloride ion)≤2 ppm, metal ions respectively <1 ppm, and the metal ions include Na, K, Ca, Mg, Fe, Ni, Cr, Cu, Pb.

The mixture crystal containing $LiPF_6$ of the present invention has small crystal particle size and uniform distribution, and high $LiPF_6$ content, which is conducive to the dissolution in the electrolyte solution, and the dissolution exotherm is small and uniform. The mixture crystal containing $LiPF_6$ of the present invention has small specific surface area, high bulk density, small angle of repose, good fluidity, is not easy to agglomerate into a block, easy to operate and control in electrolyte solution production and easy to control the heat of dissolution in the dissolution process. The crystal structure of the $LiPF_6$ mixture crystal of the present invention makes $LiPF_6$ to be less sensitive to hydrolysis, thereby inhibiting the generation of HF, protecting the electrochemical system in the battery, and significantly improving the high-temperature storage performance and high-temperature cycle performance of the secondary lithium battery.

The electrolyte solution prepared by the $LiPF_6$ mixture crystal of the present invention has high electrochemical performance, good cycle performance, long service life and high rate performance, and can meet the requirements of high-rate charge and discharge of batteries.

In the present invention, the non-aqueous electrolyte solution further includes an additive, and relative to 100% by weight of the electrolyte solution, the additive is added in an amount of 0.01-5%, preferably 0.2-3%.

In the electrolyte solution of the present invention, the additive used includes at least two of lithium difluorophosphate, lithium bis(trifluoromethanesulphonyl)imide and fluorocarbonate. Preferably, the additives include a mixture of lithium difluorophosphate, lithium bis(trifluoromethanesulphonyl)imide and fluorocarbonate. Further preferably, relative to 100% by weight of the electrolyte solution, the weight ratio of lithium difluorophosphate, lithium bis(trifluoromethanesulphonyl)imide and fluorocarbonate is 1:(0.5-1.5):(2.5-3.5).

The $LiPF_6$ mixture crystal of the present invention is used as an electrolyte, and the mutual combination with the additives lithium difluorophosphate, lithium bis(trifluoromethanesulphonyl)imide and fluorocarbonate can improve the high temperature cycle performance, high temperature storage performance and low temperature output performance of the non-aqueous electrolyte solution and the secondary lithium battery.

The fluorocarbonate includes fluoroethylene carbonate and/or trifluoropropylene carbonate; further preferably, the weight ratio of fluoroethylene carbonate to trifluoropropylene carbonate is 1:(1-6), preferably 1:(1-3).

In the non-aqueous electrolyte solution of the present invention, the additive may further include bis(4-fluorophenyl) sulfone, and the added amount of the bis(4-fluorophenyl) sulfone accounts for 0-30% of the total weight of the additive, preferably 0.8-15%. Bis (4-fluorophenyl) sulfone prevents continuous oxidation and reduction of the electrolyte solution by forming an SEI film on the surfaces of the positive electrode and the surface of the negative electrode, improving the cycle life of the electrolyte solution at high temperatures. More particularly, the high voltage characteristic of the electrolyte solution is improved.

In the non-aqueous electrolyte solution of the present invention, the additive may further include a metal fluoride, and the metal fluoride may be any one selected from LiF, RbF, TiF, AgF and a combination thereof, and the added amount of the metal fluoride accounts for 0-30%, preferably 0.8-15% of the total weight of the additive. Metal fluoride can inhibit the reaction of positive electrode active substances and electrolytes, suppress the phenomenon of sudden reduction in battery capacity.

The organic solvent is a non-aqueous solvent of cyclic carbonate and/or chain carbonate.

More than one cyclic carbonate-based solvent and/or chain carbonate-based solvent is preferred. Specifically, the cyclic carbonate-based solvent is selected from any one of ethylene carbonate (EC), propylene carbonate (PC), butylene carbonate (BC), vinylene carbonate (VC), 4-fluoro-1,3-dioxolane-2-one (FEC) or a mixture of two or more thereof, but the present invention is not limited thereto. As a combination of cyclic carbonates, preferably, EC and VC, EC and FEC, PC and VC are combined, and the volume ratio of components in each combination is 1:(0.1-10), preferably 1:(0.2-5).

The chain carbonate solvent is selected from any one of dimethyl carbonate (DMC), diethyl carbonate (DEC), dipropyl carbonate (DPC), methyl propyl carbonate (MPC), ethyl methyl carbonate (EPC), ethyl methyl carbonate (EMC), or a mixture of two or more thereof, but the present invention is not limited thereto. As a combination of chain carbonate, preferably, EMC and DEC, MPC and DPC, DMC and EMC are combined, and the volume ratio of components in each combination is 1:(0.1-10), preferably 1:(0.2-5).

Further preferably, the organic solvent is a mixture of cyclic carbonate and chain carbonate, and the volume ratio of cyclic carbonate and chain carbonate is 1:(1-9), preferably 1:(1.2-4).

The organic solvent is a mixture of a cyclic carbonate-based solvent and a chain carbonate-based solvent, especially with the above ratio, the cycle characteristics of the electrolyte solution at high temperature can be significantly improved, and the output performance can be improved.

The mixture crystal containing $LiPF_6$ of the present invention can be prepared by the aforementioned method, microchannel reactor and continuous system.

Based on the non-aqueous electrolyte solution, the present invention also provides a secondary lithium battery comprising the non-aqueous electrolyte solution described above in the present invention.

The secondary lithium battery includes a positive electrode and a negative electrode; wherein the positive electrode includes positive electrode active materials disposed opposite to each other, and the negative electrode includes a negative electrode active material; and a separator is located between the positive electrode and the negative electrode, and a non-aqueous electrolyte solution.

The positive electrode is formed by applying a positive electrode active material layer onto a positive electrode coating composition of a positive current collector, for example, an aluminium foil rolled composition, wherein the positive electrode active material layer is prepared by mixing a positive electrode active material, a conductive agent and a binder.

The positive electrode active material of the secondary lithium battery specifically includes a lithium composite metal oxide containing lithium and at least one metal such as cobalt, manganese, nickel, or aluminum. Examples of such lithium composite metal oxides are, for example, lithium cobalt oxides (eg, lithium cobaltate), lithium manganese oxides (eg, lithium manganate), lithium nickel oxides (eg, lithium nickelate), lithium-nickel-manganes oxides, lithium-nickel-cobalt oxides, lithium-nickel-manganese-cobalt oxides, lithium-nickel-cobalt-transition metal (M) oxides, etc., and can include any one of them or a mixture of two or more thereof.

The conductive agent of the positive electrode is not particularly limited as long as it is an electronically conductive material that does not undergo chemical change. For example, natural graphite (flake graphite, etc.), graphite, artificial graphite, acetylene black, Ketjen black, channel black, furnace black, lamp black, thermal black, etc.

The binder can be polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluororubber, various copolymers, and the like.

Negative electrodes can be prepared by methods known in the art. For example, a negative electrode active material can be prepared by coating a negative electrode active material layer formed by a negative electrode active material and a conductive agent mixed with a binder, on a negative electrode current collector. As the negative electrode active material, a compound capable of reversibly intercalating and deintercalating lithium can be used, for example, one of the group consisting of a free lithium metal, a carbon material capable of reversibly intercalating/deintercalating lithium ions, a metal or an alloy of lithium and the metal, metal composite oxides, materials that can be doped or undoped with lithium, and transition metal oxides.

The separator for batteries is not particularly limited, for example, may be polypropylene or polyethylene.

The secondary lithium battery can be manufactured by conventional methods, and can be prepared by a variety of well-known positive electrode materials, negative electrode materials and separators. The secondary lithium battery containing the non-aqueous electrolyte solution provided by the present invention can be a lithium ion battery, a lithium polymer battery, and can be divided into cylindrical, prismatic, coin type, bag type, etc., and can be divided into block type and thin film type according to the size. According to the embodiments of the present invention, the electrolyte solution can be applied irrespective of the type.

The non-aqueous electrolyte solution and secondary lithium battery provided by the present invention have high electrochemical performance, good cycle performance, long service life, high rate performance, and can meet the requirements of high-rate charge and discharge of batteries, and have excellent cycle performance and storage performance at high temperature; in addition, the low-temperature output performance is also improved remarkably.

The secondary lithium battery comprising the non-aqueous electrolyte solution of the present invention can be widely used in telephones, cell phones, notebook computers, digital cameras, portable devices such as camcorders, electric vehicles, hybrid electric vehicles, and medium or large energy storage systems.

According to the sixth aspect, the present invention provides a highly stable fluorine-containing electrolyte solution with low water content, high consistency, good solubility, uniform film formation on the electrode surface, and good battery durability.

The technical solutions of the present invention:

A fluorine-containing electrolyte solution, comprising $LiPF_6$, the $LiPF_6$ used in the preparation of the fluorine-containing electrolyte solution is $LiPF_6$ with 68% (wt) or more of the particle size greater than or equal to 0.2 mm and less than or equal to 0.3 mm, and the water content of $LiPF_6$ is less than 6 ppm. Preferably, the particle size of more than 80% (wt) of the $LiPF_6$ crystal particles is 0.18-0.35 mm.

Preferably, the $LiPF_6$ used when preparing the fluorine-containing electrolyte solution is $LiPF_6$ with more than 75% (wt) of the particle size greater than or equal to 0.2 mm and less than or equal to 0.3 mm. Preferably, the particle size of more than 85% (wt) of the $LiPF_6$ crystal particles is 0.18-0.35 mm.

Further preferably, the $LiPF_6$ used when preparing the fluorine-containing electrolyte solution is $LiPF_6$ with more than 80% (wt) of the particle size greater than or equal to 0.2 mm and less than or equal to 0.3 mm. Preferably, the particle size of more than 90% (wt) of the $LiPF_6$ crystal particles is 0.18-0.35 mm.

Further preferably, the $LiPF_6$ used when preparing the fluorine-containing electrolyte solution is $LiPF_6$ with more than 85% (wt) of the particle size greater than or equal to 0.2 mm and less than or equal to 0.3 mm. Preferably, the particle size of more than 95% (wt) of the $LiPF_6$ crystal particles is 0.18-0.35 mm.

Further preferably, the $LiPF_6$ used when preparing fluorine-containing electrolyte solution is $LiPF_6$ with more than 90% (wt) of the particle size greater than or equal to 0.2 mm and less than or equal to 0.3 mm. Preferably, the particle size of more than 99% (wt) of the $LiPF_6$ crystal particles is 0.18-0.35 mm.

Preferably, the water content of $LiPF_6$ is less than 5 ppm. Further preferably, the water content of $LiPF_6$ is less than 4 ppm, 3 ppm, 2 ppm, 1 ppm.

The $LiPF_6$ crystal particle size used in the preparation of fluorine-containing electrolyte solution is evenly distributed, and 30-50% (wt) of the crystal particle size is greater than or equal to 0.2 mm and less than 0.25 mm, and 30-50% (wt) of the crystal particle size is greater than or equal to 0.25 mm and less than or equal to 0.3 mm. Preferably, 35-50% (wt) of the crystal particle size is greater than or equal to 0.2 mm and less than 0.25 mm, and 35-50% (wt) of the crystal particle size is greater than or equal to 0.25 mm and less than or equal to 0.3 mm. Preferably, 40-50% (wt) of the crystal particle size is greater than or equal to 0.2 mm and less than 0.25 mm, and 40-50% (wt) of the crystal particle size is greater than or equal to 0.25 mm and less than or equal to 0.3 mm.

In the fluorine-containing electrolyte solution, the mass percentage of $LiPF_6$ is 5-20 wt %; preferably 6-18 wt %; further preferably, 8-16 wt %, 9-15 wt %, and 10-13 wt %.

The fluorine-containing electrolyte solution also includes at least one fluorine-containing lithium salt selected from the group consisting of $LiPO_2F_2$, $LiBF_2C_2O_4$, $LiBF_4$, $LiPF_6$, LiFSI, LiTFSI, $LiAsF_6$, $LiClO_4$, $LiSO_3CF_3$, $LiC_2O_4BC_2O_4$, $LiF_2BC_2O_4$, $LiPO_2F_2$, $LiPF_2$, $LiPF_4C_2O_4$ and $LiPF_2C_4O_8$. The mass percentage of the fluorine-containing lithium salt in the fluorine-containing electrolyte solution is 0.1-5 wt %. The addition of the fluorine-containing lithium salt improves the conductivity, stability, and film-forming performance of the electrolyte solution, and improves the cycle characteristics and durability of the battery.

Preferably, the fluorine-containing electrolyte solution also includes $LiPO_2F_2$ and $LiBF_2C_2O_4$. Preferably, the mass ratio of $LiPF_6$:$LiPO_2F_2$:$LiBF_2C_2O_4$ is (50-90):(5-40):(5-30); more preferably, (55-85):(10-30):(10-25).

Preferably, the fluorine-containing electrolyte solution also includes 1,2-Bis(trifluoromethyl)benzene.

Preferably, in the present invention, the mass percentage of 1,2-Bis(trifluoromethyl)benzene in the fluorine-containing electrolyte solution is 0.1-3 wt %. The addition of 1,2-Bis(trifluoromethyl)benzene improves the electrode permeability and film-forming performance of the electrolyte solution of the present invention, so that the fluorine-containing electrolyte solution has good stability and safety, etc. Preferably, the mass percentage of 1,2-Bis(trifluoromethyl)benzene in the fluorine-containing electrolyte solution is 0.5-2 wt %.

The fluorine-containing electrolyte solution includes ethylene carbonate, ethyl methyl carbonate and diethyl carbonate. The total mass percentage of ethylene carbonate, ethyl methyl carbonate and diethyl carbonate in the fluorine-containing electrolyte solution is 70-90 wt %, and the mass ratio of ethylene carbonate, ethyl methyl carbonate and diethyl carbonate is (2.5-3.5): (4.5-5.5):(1.5-2.5). Ethylene carbonate, ethyl methyl carbonate and diethyl carbonate are used together as the non-aqueous solvent in the electrolyte solution of the present invention, which has a synergistic effect; and the effect is better than ethylene carbonate, ethyl methyl carbonate and diethyl carbonate used alone. Preferably, the total mass percentage of ethylene carbonate, ethyl methyl carbonate and diethyl carbonate in the fluorine-containing electrolyte solution is 75-80 wt %, and the mass ratio of ethylene carbonate, ethyl methyl carbonate and diethyl carbonate is (2.8-3.2):(4.8-5.2):(1.8-2.2).

In the present invention, $LiPF_6$ can be prepared by the aforementioned method, microchannel reactor and continuous system.

In the present invention, optionally, the fluorine-containing electrolyte solution may also include diethyl ether, with a mass percentage of 0-15 wt %, to adjust the ionic conductivity. Optionally, the mass percentage of diethyl ether is 2-5 wt %.

In the present invention, optionally, the fluorine-containing electrolyte solution may also include trifluoromethyl ethyl sulfone, with a mass percentage of 0-20 wt %, to improve the cycle performance and durability of the battery. Optionally, the mass percentage of trifluoromethyl ethyl sulfone is 5-10 wt %.

In the present invention, each component used for preparing the electrolyte solution has undergone dehydration steps such as drying or purification. The water content of the fluorine-containing electrolyte solution product of the present invention is less than 6 ppm. Preferably, less than 5 ppm, 4 ppm, 3 ppm, 2 ppm, 1 ppm.

Preferably, the fluorine-containing electrolyte solution of the present invention is only composed of $LiPF_6$, $LiPO_2F_2$, $LiBF_2C_2O_4$, ethylene carbonate, ethyl methyl carbonate and diethyl carbonate.

Preferably, the fluorine-containing electrolyte solution of the present invention is only composed of $LiPF_6$, $LiPO_2F_2$, $LiBF_2C_2O_4$, 1,2-Bis(trifluoromethyl)benzene, ethylene carbonate, ethyl methyl carbonate and diethyl carbonate.

Preferably, the fluorine-containing electrolyte solution of the present invention is only composed of $LiPF_6$, $LiPO_2F_2$, $LiBF_2C_2O_4$, 1,2-Bis(trifluoromethyl)benzene, ethylene carbonate, ethyl methyl carbonate, diethyl carbonate, diethyl ether and trifluoromethyl ethyl sulfone.

The fluorine-containing electrolyte solution of the present invention is produced by a conventional large-scale production method.

Further, the lithium ion battery using the fluorine-containing electrolyte solution of the present invention comprises a positive electrode, a negative electrode and an electrolyte solution.

In the present invention, the $LiPF_6$ used to prepare the electrolyte solution does not contain powdered $LiPF_6$. The $LiPF_6$ has uniform particle size, high stability and is not easy to deteriorate during storage and preparation. $LiPF_6$ particles have a moderate size, good fluidity, and are easy to operate in the preparation process, have good dissolution effect, and high preparation efficiency.

Each batch of products has high consistency, stable quality and excellent product properties.

In the present invention, the components in the fluorine-containing electrolyte solution act synergistically, so that the fluorine-containing electrolyte solution has the advantages of high stability, good durability, and good battery cycle performance. The fluorine-containing electrolyte solution of the present invention has low water content, high safety and high stability.

Figure 1:
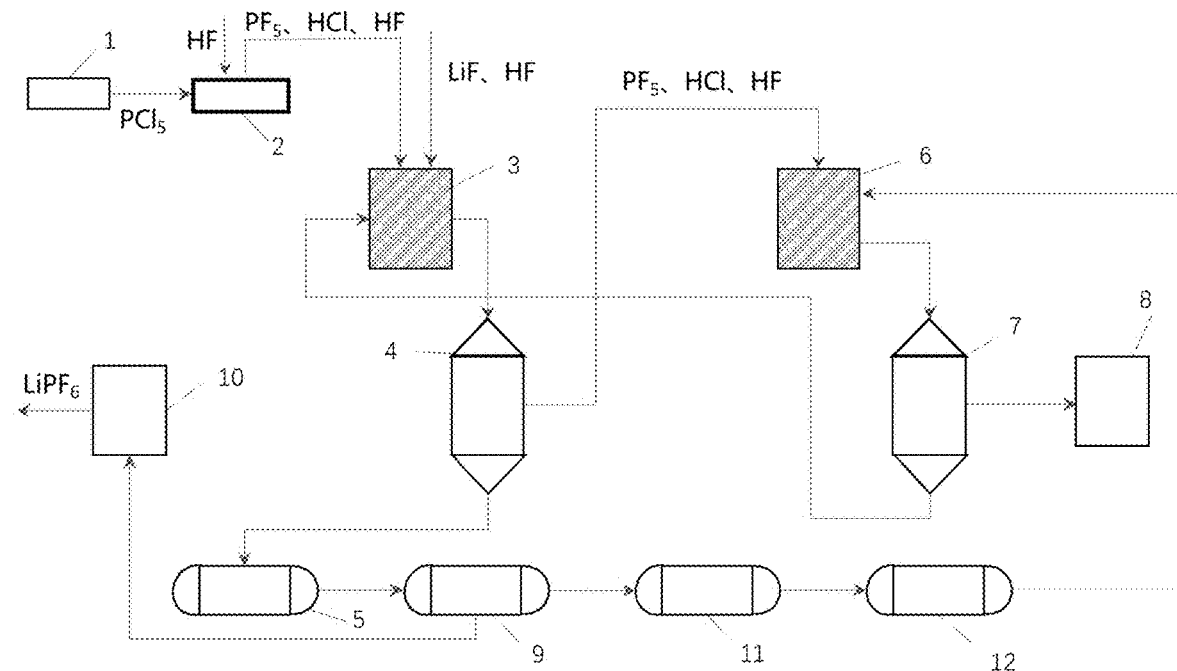
FIG. 1 is a flow chart of a process for producing $LiPF_6$ of the present invention.

Reference numerals: 1—solid conveyor; 2—PF5 generator; 3—first microchannel reactor; 4—first gas-liquid separator; 5—synthetic liquid tank; 6—second microchannel reactor; 7—second gas-liquid separator; 8—separation system; 9—crystallization tank; 10—drying system; 11—mother liquor tank; 12—LiF dissolution tank.

DETAILED DESCRIPTION

The production process of the present invention will be described in detail through the following embodiments, but the present invention is not limited to these embodiments.

Example 1.1

PCl5 was transported to a PF5 generator 2 with a cooling jacket that stored HF through a solid conveyor 1 with a metering device, and the temperature was controlled to be about 0° C. PCl5 reacted with HF to produce PF5 and HCl. The mixed gas PF5, HCl and entrained HF gas were introduced into a first microchannel reactor 3 to form a first feed stream. In the dissolution tank with cooling jacket and stirrer, HF was added, and LiF was added into the dissolution tank with a solid feeding device while cooling, and the dissolution temperature was controlled at about 0° C., and the mass fraction of LiF to be 2 wt %. The HF solution with dissolved LiF was pumped into the first microchannel reactor 3 to form a second feed stream. The reaction temperature of the first microchannel reactor 3 was 3° C., and the residence time was 5 seconds. The gas-liquid mixture material from the first microchannel reactor 3 entered the first gas-liquid separator 4, and the liquid in the first gas-liquid separator 4 was transported to the synthetic liquid tank 5 for storage, and the gases separated by the first gas-liquid separator included unreacted PF5, HCl and entrained HF. The mixed gas was transported to the second microchannel reactor 6 to react with the third feed stream containing $LiPF_6$, LiF and HF. The reaction temperature of the second microchannel reactor 6 was 3° C., and the residence time was 5 seconds. The gas-liquid mixture in the second microchannel reactor entered the second gas-liquid separator 7, and the gas separated by the second gas-liquid separator 7 contained HCl and entrained HF, and the mixed gas entered a HF and HCl separation system 8 through a pressurized device. The liquid separated by the second gas-liquid separator 7 contained $LiPF_6$ in the original mother liquor, $LiPF_6$ produced by the new reaction and LiF that was not reacted completely. The mixed liquid was transported to the first microchannel reactor 3 as a fourth feed stream. The synthetic liquid in the synthetic liquid tank 5 was transported to a crystallization tank 9 for crystallization of $LiPF_6$, and $LiPF_6$ was crystallized in a cooling state. In the crystallization tank 9, the cooling rate of the synthetic liquid was 2° C./h, the stirring rate of the stirrer was 50 rpm, the synthetic liquid was cooled from 20° C. to −45° C., and kept for 6 hours after cooled to −45° C. Then drying and acid removal was carried out in the drying system 10 after solid crystallization and filtration, to obtain a $LiPF_6$ crystal. The filtered mother liquor was stored in the mother liquor tank 11. After the content of $LiPF_6$ in mother liquor in mother liquor tank 11 was determined quantitatively, the mother liquor was conveyed to the LiF dissolution tank 12 for the preparation of quantitative LiF solution. The HF solution containing $LiPF_6$ dissolved a certain amount of LiF and was transported to the second microchannel reactor 6 for reaction to form the third feed stream. The molar ratio of PF5 to LiF in the first microchannel reactor was 2:1, and the molar ratio of PF5 to LiF in the second microchannel reactor was 1:1.

After testing, the purity of the generated $LiPF_6$ crystal was 99.99%, the yield was 99.6%, the particle size of more than 82% (wt) of the crystal particles was 0.2-0.3 mm, and the particle size of more than 91% (wt) of the crystal particles was 0.18-0.35 mm.

Example 1.2

The process of this example was basically the same as that of Example 1.1, except the difference that the reaction temperature of the first microchannel reactor was 5° C., the residence time was 10 seconds, the reaction temperature of the second microchannel reactor was 8° C., and the residence time was 10 seconds.

After testing, the purity of the generated $LiPF_6$ crystal was 99.994%, the yield was 99.8%, the particle size of more than 85% (wt) of the crystal particles was 0.2-0.3 mm, and the particle size of more than 93% (wt) of the crystal particles was 0.18-0.35 mm.

Example 1.3

The process of this example was basically the same as that of Example 1.2, except the difference that the molar ratio of PF5 to LiF in the first microchannel reactor was 2.5:1, and the molar ratio of PF5 to LiF in the second microchannel reactor was 1:1.1.

After testing, the purity of the generated $LiPF_6$ crystal was 99.995%, the yield was 99.8%, the particle size of more than 85% (wt) of the crystal particles was 0.2-0.3 mm, and the particle size of more than 94% (wt) of the crystal particles was 0.18-0.35 mm.

Example 1.4

The process of this example was basically the same as that of Example 1.1, except the difference that the reaction temperature of the first microchannel reactor was 4° C., the residence time was 10 seconds, the reaction temperature of the second microchannel reactor was 6° C., and the residence time was 12 seconds.

After testing, the purity of the resulting $LiPF_6$ crystal was 99.995%, the yield was 99.85%, the particle size of more than 85% (wt) of the crystal particles was 0.2-0.3 mm, and the particle size of more than 94% (wt) of the crystal particles was 0.18-0.35 mm.

Example 1.5

The process of this example was basically the same as that of Example 1.1, except the difference that in the crystallization tank, the cooling rate of the synthetic liquid was 35° C./h, the stirring speed of the stirrer was 800 rpm, the synthetic liquid was cooled from 25° C. to −10° C., and kept for 1 hour after cooling to −10° C.

After testing, the purity of the generated $LiPF_6$ crystal was 99.994%, the yield was 99.83%, the particle size of more than 86% (wt) of crystal particles was 0.2-0.3 mm, and the particle size of more than 92% (wt) of crystal particles was 0.18-0.35 mm.

Comparative Example 1.1

This comparative example was basically the same as that of Example 1.1, except the difference that the first feed stream that was introduced into the first microchannel reactor was purified PF5 gas.

After testing, the purity of the generated $LiPF_6$ crystal was 99.91%, the yield was 99.3%, the particle size of more than 70% (wt) of crystal particles was 0.2-0.3 mm, and the particle size of more than 75% (wt) of crystal particles was 0.18-0.35 mm.

Comparative Example 1.2

This comparative example was basically the same as that of Example 1.1, except the difference that the first feed stream that was introduced into the first microchannel reactor was purified PF5 gas. No second microchannel reactor was set. The molar ratio of PF5 to LiF in the first microchannel reactor was 1.5:1.

After testing, the purity of the generated $LiPF_6$ crystal was 99.85%, the yield was 98.3%, the particle size of more than 62% (wt) of crystal particles was 0.2-0.3 mm, and the particle size of more than 67% (wt) of crystal particles was 0.18-0.35 mm.

Comparative Example 1.3

This comparative example was basically the same as that of Example 1.1, except the difference that the first and second microchannel reactors were replaced by the first and second reactors, respectively. After being replaced with reactors, for batch production, the reaction time of the first and second reactors increased to 5 hours.

After testing, the purity of the resulting $LiPF_6$ crystal was 99.7%, the yield was 95.6%, the particle size of more than 55% (wt) of crystal particles was 0.2-0.3 mm, and the particle size of more than 60% (wt) of crystal particles was 0.18-0.35 mm.

Comparative Example 1.4

This comparative example was basically the same as that of Example 1.2, except the difference that in the crystallization tank, the cooling rate of the synthetic liquid was 10° C./h, the stirring speed of the stirrer was 100 rpm, the synthetic liquid was cooled from 25° C. to −45° C., and kept for 6 hours after cooling to −45° C.

After testing, the purity of the generated $LiPF_6$ crystal was 99.96%, the yield was 99.5%, the particle size of more than 72% (wt) of crystal particles was 0.2-0.3 mm, and the particle size of more than 80% (wt) of crystal particles was 0.18-0.35 mm.

Instructions for Examples 2.1 to 2.3

Examples 2.1 to 2.3 provided a continuous system for producing $LiPF_6$ based on a microchannel reactor. The continuous system included a PF5 generator (2), a first microchannel reactor (3), a gas-liquid separator A (4), a second microchannel reactor (6), and a gas-liquid separator B (7). The reverse cycle reaction was carried out by using the gas containing PF5 and HF solution with dissolved LiF as raw materials. Wherein, the first microchannel reactor (3) and the second microchannel reactor (6) were reactors with the same structure, which were enhanced hybrid channel structures; the cross-sectional shape of the channel was a heart-shaped structure, the equivalent diameter of the channel was 2 mm, and the liquid holding volume was 50 ml. The hard material of the channel walls was silicon carbide.

Preferably, the continuous system transported $PCl_5$ to a PF5 generator (2) that stored HF through a solid conveyor (1) with a metering device, and $PCl_5$ reacted with HF to generate PF5 and by-product HCl, as shown in the chemical formula (1). Further, the solid conveyor (1) was preferably a solid conveyor (1) with a metering device; the PF5 generator (2) that stored HF was preferably a PF5 generator (2) with a cooling jacket that stored HF, further preferably a PF5 generator with a stirring device.

$$5HF+PCl_5 \rightarrow 5HCl+PF5 \qquad (1)$$

The mixed gas PF5, HCl and entrained HF gas generated in the PF5 generator (2) were introduced into the microchannel reactor A (3), and the HF solution with dissolved LiF was transported simultaneously with a pump in the first microchannel reactor (3). LiF in PF5 and HF solution reacted rapidly and released the reaction heat, as shown in the chemical formula (2).

$$LiF(liquid)+PF5(gas) \rightarrow LiPF_6 \qquad (2)$$

The gas-liquid mixture material from the first microchannel reactor (3) mainly contained the target product $LiPF_6$, unreacted PF5, and HCl and HF that were not involved in the reaction.

The gas-liquid mixture material from the first microchannel reactor (3) entered the gas-liquid separator A (4) for gas-liquid separation, and the liquid therein, namely the $LiPF_6$-containing component, was transported to the synthetic liquid tank (5) to store. The separated gas that contained unreacted PF5 and entrained HF and HC components was transported to the second microchannel reactor (6), and reacted with the HF solution in which LiF and $LiPF_6$ were dissolved.

LiF in PF5 and HF solution reacted rapidly and released the reaction heat, as shown in the chemical formula (3).

$$LiF+PF5(gas) \rightarrow LiPF_6 \qquad (3)$$

The gas-liquid mixture material coming out of the second microchannel reactor (6) mainly contained the target product $LiPF_6$, HCl and HF.

The gas-liquid mixture coming out of the second microchannel reactor (6) entered the gas-liquid separator B (7), the gas separated in the gas-liquid separator B (7) contained HCl and HF, and the separated liquid contained $LiPF_6$ and unreacted LiF.

Preferably, the gas separated in the gas-liquid separator B (7) was transported to the HF and HCl separation system (8) through a pressurized device. The HCl at the top of the gas separation system (8) was absorbed by water to form industrial hydrochloric acid, and the HF at the bottom could be recycled as the reaction raw material. The HF and HCl separation system (8) was preferably a separating tower.

The liquid separated in gas-liquid separator B (7), namely, the mixed liquid containing $LiPF_6$ and unreacted LiF, was transported to the first microchannel reactor (3) to continue to react with the PF5 therein, so that the LiF in the mixed liquid could react completely.

The synthetic liquid in the synthetic liquid tank (5) was transported to the crystallization tank (9) for crystallization of $LiPF_6$. $LiPF_6$ was crystallized in the cooling state. After the crystallization and filtration, drying and acid removal was carried out in a drying system (10), to obtain the $LiPF_6$ product.

Further preferably, the filtered mother liquor was stored in the mother liquor tank (11), and after the $LiPF_6$ content in the mother liquor in the mother liquor tank (11) was quantitatively determined, the mother liquor was delivered to the LiF dissolution tank (12) for the preparation of quantitative LiF solution. The HF solution containing $LiPF_6$ dissolved a quantitative amount of LiF and was transported to the second microchannel reactor (6) for the reaction. So far, the reaction system could run continuously.

A $LiPF_6$ product prepared by the above continuous system for producing $LiPF_6$ could achieve high purity, and there was no need of further purification. The purity could reach more than 99.98%, preferably more than 99.99%. The types and contents of impurities included were as follows: water≤20 ppm, preferably ≤15 ppm; free acid (calculated as HF)≤90 ppm, preferably ≤80 ppm, more preferably ≤50 ppm; insoluble substance≤200 ppm, preferably ≤160 ppm, more preferably 110 ppm; sulfate (calculated as $SO_4$)≤5 ppm, preferably ≤4 ppm; chloride (calculated as Cl)≤2 ppm; other various metal ions≤1 ppm.

Example 2.1

Figure 2:
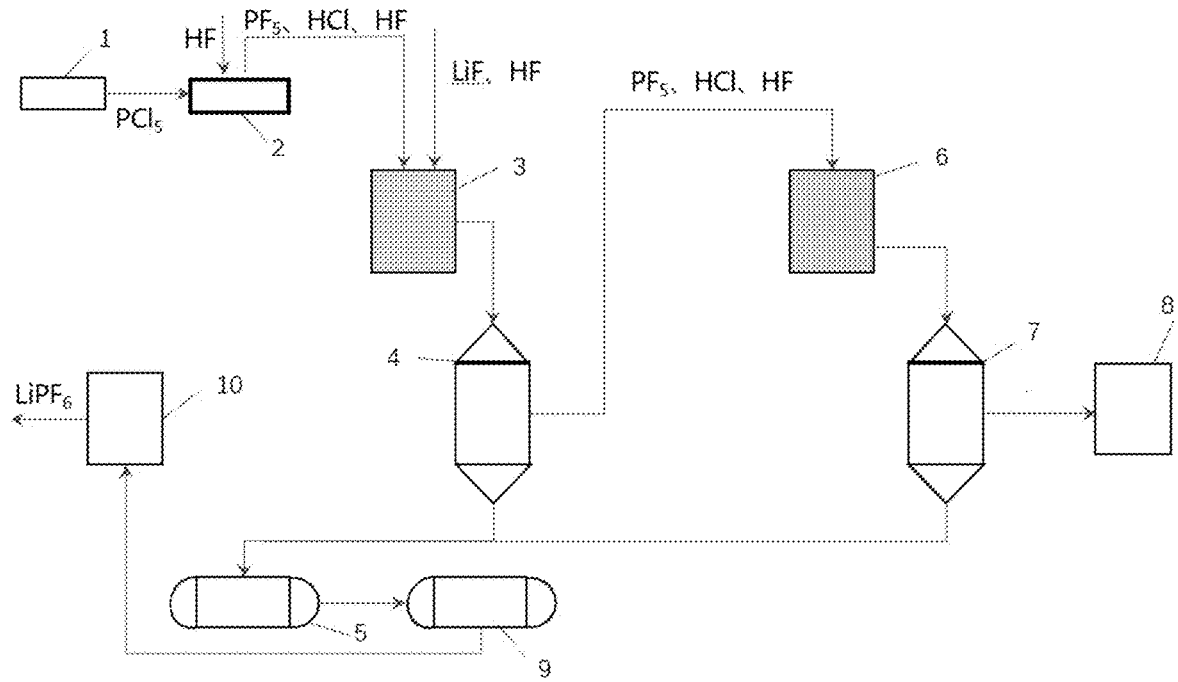
FIG. 2 is a process flow diagram of a continuous system for producing $LiPF_6$ in Example 2.1.

Example 2.1 was further described in detail below with reference to FIG. 2. HF was transported by a pump in a dissolution tank with a cooling jacket and a stirrer, and LiF was added through a solid feeding device while cooling. The speed of adding LiF should be appropriate to control the HF temperature at 0° C. The concentration of LiF was 5 wt %. At the same time, $PCl_5$ was transported to the PF5 generator (2) containing HF through the solid conveyor (1) with a metering device to generate PF5 gas. Under pressurization, the HF solution with dissolved LiF and PF5 gas were transported to the first microchannel reactor (3) by a pump. The molar ratio of the reactant PF5 to LiF in the first microchannel reactor (3) was 2:1, the residence time of the reactants was 30 seconds, and the reaction temperature was 15° C. The reactants entered the first microchannel reactor (3) in a continuous state, and the output materials were output in a continuous state and then entered the gas-liquid separator A (4) for gas-liquid separation. The liquid phase product obtained by separation, namely the component containing $LiPF_6$, was transported to the synthetic liquid tank (5) for standby. The separated gas phase product, namely, the component containing unreacted PF5 and entrained HF and HCl, was transported to the second microchannel reactor (6), and reacted with the HF solution with dissolved LiF (containing $LiPF_6$). The molar ratio of the reactant PF5 to LiF in the second microchannel reactor (6) was 1:1.67, the residence time of the reactants was 30 seconds, and the reaction temperature was 15° C.

The mixed material coming out of the second microchannel reactor (6) entered the gas-liquid separator B (7), the gas separated in the gas-liquid separator B (7) contained HCl and HF, the separated liquid contained $LiPF_6$ and unreacted LiF. The gas separated in the gas-liquid separator B (7) was pressurized by entering a compressor, and then transported to the HF and HCl separation system (8), namely, the separating tower. The HCl at the top of the tower was absorbed by water to form industrial hydrochloric acid, and the HF at the bottom of the tower could be recycled.

The liquid separated in the gas-liquid separator B (7), namely, the mixed liquid containing $LiPF_6$ and unreacted LiF, was transported to the synthetic liquid tank (5), and the synthetic liquid in the synthetic liquid tank (5) was transported to the crystallization tank (9) by a pump for crystallization of $LiPF_6$. $LiPF_6$ was crystallized in a cooling state. After the crystallization and filtration, heating and nitrogen purging and drying, and acid removal were carried out in the drying system (10), to obtain the $LiPF_6$ product.

Example 2.2

Figure 3:
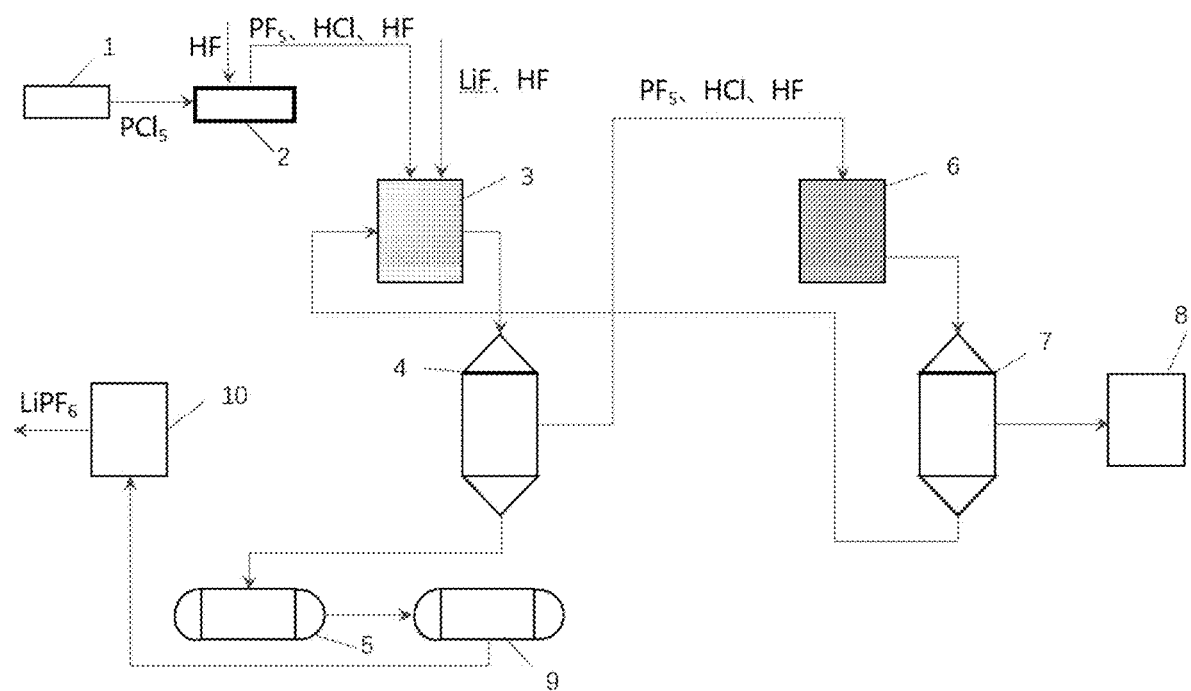
FIG. 3 is a process flow diagram of a continuous system for producing $LiPF_6$ in Example 2.2.

Example 2.2 was further described in detail below with reference to FIG. 3. HF was transported by a pump in a dissolution tank with a cooling jacket and a stirrer, and LiF was added through a solid feeding device while cooling. The speed of adding LiF should be appropriate to control the HF temperature at 0° C. The concentration of LiF was 4 wt %. At the same time, $PCl_5$ was transported to the PF5 generator (2) containing HF through the solid conveyor (1) with a metering device to generate PF5 gas. Under pressurization, the HF solution with dissolved LiF and PF5 gas were transported to the first microchannel reactor (3) by a pump. The molar ratio of the reactant PF5 to LiF in the first microchannel reactor (3) was 2:1, the residence time of the reactants was 30 seconds, and the reaction temperature was 15° C. The reactants entered the first microchannel reactor (3) in a continuous state, and the output materials were output in a continuous state and then entered the gas-liquid separator A (4) for gas-liquid separation. The liquid phase product obtained by separation, namely the component containing $LiPF_6$, was transported to the synthetic liquid tank (5) for standby. The separated gas phase product, namely, the component containing unreacted PF5 and entrained HF and HCl, was transported to the second microchannel reactor (6), and reacted with the HF solution with dissolved LiF (containing $LiPF_6$). The molar ratio of the reactant PF5 to LiF in the microchannel reactor B (6) was 1:1.67, the residence time of the reactants was 30 seconds, and the reaction temperature was 15° C. The mixed material coming out of the second microchannel reactor (6) entered the gas-liquid separator B (7), the gas separated in the gas-liquid separator B (7) contained HCl and HF, the separated liquid contained $LiPF_6$ and unreacted LiF. The gas separated in the gas-liquid separator B (7) was pressurized by entering a compressor, and then transported to the HF and HCl separation system (8), namely, the separating tower. The HCl at the top of the tower was absorbed by water to form industrial hydrochloric acid, and the HF at the bottom of the tower could be recycled.

The liquid separated in the gas-liquid separator B (7), namely, the mixed liquid containing $LiPF_6$ and unreacted LiF, was transported to the first microchannel reactor (3) by a pump, to continue to react with PF5 therein, so that the LiF in the mixed liquid reacted completely. Namely, the continuous reverse cycle $LiPF_6$ synthesis reaction consisting of two microchannel reactors was completed. The synthetic liquid in the synthetic liquid tank (5) was transported to the crystallization tank (9) by a pump for crystallization of $LiPF_6$. $LiPF_6$ was crystallized in a cooling state. After the crystallization and filtration, heating and nitrogen purging and drying, and acid removal were carried out in the drying system (10), to obtain the $LiPF_6$ product.

Example 2.3

Example 2.3 was further described in detail below with reference to FIG. 1. HF was transported by a pump in a dissolution tank with a cooling jacket and a stirrer, and LiF was added through a solid feeding device while cooling. The speed of adding LiF should be appropriate to control the HF temperature at 0° C. The concentration of LiF was 4 wt %. At the same time, $PCl_5$ was transported to the PF5 generator (2) containing HF through the solid conveyor (1) with a metering device to generate PF5 gas. Under pressurization, the HF solution with dissolved LiF and PF5 gas were transported to the first microchannel reactor (3) by a pump. The molar ratio of the reactant PF5 to LiF in the first microchannel reactor (3) was 2:1, the residence time of the reactants was 30 seconds, and the reaction temperature was 15° C. The reactants entered the microchannel reactor A (3) in a continuous state, and the output materials were output in a continuous state and then entered the gas-liquid separator A (4) for gas-liquid separation. The liquid phase product obtained by separation, namely the component containing $LiPF_6$, was transported to the synthetic liquid tank (5) for standby. The separated gas phase product, namely, the component containing unreacted PF5 and entrained HF and HCl, was transported to the second microchannel reactor (6), and reacted with the HF solution with dissolved LiF (containing $LiPF_6$). The molar ratio of the reactant PF5 to LiF in the second microchannel reactor (6) was 1:1.67, the residence time of the reactants was 30 seconds, and the reaction temperature was 15° C.

The mixed material coming out of the second microchannel reactor (6) entered the gas-liquid separator B (7), the gas separated in the gas-liquid separator B (7) contained HCl and HF, the separated liquid contained $LiPF_6$ and unreacted LiF. The gas separated in the gas-liquid separator B (7) was pressurized by entering a compressor, and then transported to the HF and HCl separation system (8), namely, the separating tower. The HCl at the top of the tower was absorbed by water to form industrial hydrochloric acid, and the HF at the bottom of the tower could be recycled.

The liquid separated in the gas-liquid separator B (7), namely, the mixed liquid containing $LiPF_6$ and unreacted LiF, was transported to the first microchannel reactor (3) by a pump, to continue to react with PF5 therein, so that the LiF in the mixed liquid reacted completely. Namely, the continuous reverse cycle $LiPF_6$ synthesis reaction consisting of two microchannel reactors was completed. The synthetic liquid in the synthetic liquid tank (5) was transported to the crystallization tank (9) by a pump for crystallization of $LiPF_6$. $LiPF_6$ was crystallized in a cooling state. After the crystallization and filtration, heating and nitrogen purging and drying, and acid removal were carried out in the drying system (10), to obtain the $LiPF_6$ product.

The filtered mother liquor was further stored in the mother liquor tank (11), and after the $LiPF_6$ content in the mother liquor in the mother liquor tank (11) was quantitatively determined, the mother liquor was delivered to the LiF dissolution tank (12) for the preparation of quantitative LiF solution. The HF solution containing $LiPF_6$ dissolved a certain amount of LiF and was transported to the second microchannel reactor 6 for reaction.

Comparative Example 2.1

HF was transported by a pump in a dissolution tank with a cooling jacket and a stirrer, and LiF was added through a solid feeding device while cooling. The speed of adding LiF should be appropriate to control the HF temperature at 0° C. The concentration of LiF was 4 wt %. At the same time, $PCl_5$ was transported to the PF5 generator (2) containing HF through the solid conveyor (1) with a metering device to generate PF5 gas. Under pressurization, the HF solution with dissolved LiF and PF5 gas were transported to the first microchannel reactor (3) by a pump. The molar ratio of the reactant PF5 to LiF in the first microchannel reactor A (3) was 2:1, the residence time of the reactants was 30 seconds, and the reaction temperature was 15° C. The reactants entered the first microchannel reactor A (3) in a continuous state, and the output materials were output in a continuous state and then entered the gas-liquid separator A (4) for gas-liquid separation. The liquid phase product obtained by separation, namely the component containing $LiPF_6$, was transported to the synthetic liquid tank (5). The synthetic liquid in the synthetic liquid tank (5) was transported to the crystallization tank (9) by a pump for crystallization of $LiPF_6$. $LiPF_6$ was crystallized in a cooling state. After the crystallization and filtration, heating and nitrogen purging and drying, and acid removal were carried out in the drying system (10), to obtain the $LiPF_6$ product.

Comparative Example 2.2

HF was transported by a pump in a dissolution tank with a cooling jacket and a stirrer, and LiF was added through a solid feeding device while cooling. The speed of adding LiF should be appropriate to control the HF temperature at 0° C. The concentration of LiF was 4 wt %. At the same time, $PCl_5$ was transported to the PF5 generator (2) containing HF through the solid conveyor (1) with a metering device to generate PF5 gas. Under pressurization, the HF solution with dissolved LiF and PF5 gas were transported to the first microchannel reactor (3) by a pump. The molar ratio of the reactant PF5 to LiF in the microchannel reactor A (3) was 2:1, the residence time of the reactants was 30 seconds, and the reaction temperature was 15° C. The reactants entered the first microchannel reactor (3) in a continuous state, and the output materials were output in a continuous state and then entered the second microchannel reactor (6), the residence time of the reactants was 30 seconds, and the reaction temperature was 15° C. The mixed material coming out of the second microchannel reactor (6) entered the gas-liquid separator A (4) for gas-liquid separation. The liquid phase product obtained by separation, namely the component containing $LiPF_6$, was transported to the synthetic liquid tank (5). The synthetic liquid in the synthetic liquid tank (5) was transported to the crystallization tank (9) by a pump for crystallization of $LiPF_6$. $LiPF_6$ was crystallized in a cooling state. After the crystallization and filtration, heating and nitrogen purging and drying, and acid removal were carried out in the drying system (10), to obtain the $LiPF_6$ product.

TABLE 1

| Test Item | Example 2.1 | Example 2.2 | Example 2.3 | Comparative Example 2.1 | Comparative Example 2.2 |
|---|---|---|---|---|---|
| Purity (%) (wt) | 99.98 | 99.98 | 99.98 | 99.83 | 99.79 |
| Insoluble substances (ppm) | 150 | 160 | 145 | 240 | 220 |
| Water (ppm) | 14 | 12 | 15 | 28 | 25 |
| Free acid (calculated as HF) (ppm) | 73 | 76 | 79 | 160 | 180 |
| Sulfate (calculated as $SO_4$) (ppm) | 4 | 4 | 4 | 11 | 17 |
| chloride (calculated as Cl) (ppm) | 4 | 4 | 4 | 25 | 25 |
| Other metal ions (ppm) | 0.8 | 0.8 | 0.8 | 3 | 3 |
| HF conversion rate (%) | 86 | 88 | 90 | 72 | 75 |
| $PCl_5$ conversion rate (%) | 88 | 90 | 91 | 71 | 73 |
| LiF conversion rate (%) | 85 | 89 | 89 | 69 | 70 |

As shown in Table 1, Example 2.1-2.3 adopted two groups of microchannel reactors. After the reverse cycle reaction, the purity of the product was significantly higher than that of Comparative Example 2.1 using a single microchannel reactor and that of Comparative Example 2.2 directly connecting two groups of microchannel reactors in series; the content of impurities was lower, and the conversion rate of the product was higher.

Example 3.1

PCl5 was transported to a PF5 generator with a cooling jacket that stored HF through a solid conveyor with a metering device, and the temperature was controlled to be about 0° C. PCl5 reacted with HF to produce PF5 and HCL. The mixed gas PF5, HCl and entrained HF gas were introduced into a first microchannel reactor to form a first feed stream. In the dissolution tank with cooling jacket and stirrer, HF was added, and LiF was added into the dissolution tank with a solid feeding device while cooling, and the dissolution temperature was controlled at about 0° C., and the mass fraction of LiF to be 2 wt %. The HF solution with dissolved LiF was pumped into the first microchannel reactor to form a second feed stream. The reaction temperature of the first microchannel reactor was 3° C., and the residence time was 5 seconds. The gas-liquid mixture material from the first microchannel reactor entered the first gas-liquid separator, and the liquid in the first gas-liquid separator was transported to the synthetic liquid tank for storage, and the gases separated by the first gas-liquid separator included unreacted PF5, HCl and entrained HF.

The mixed gas was transported to the second microchannel reactor to react with the third feed stream containing $LiPF_6$, LiF and HF. The reaction temperature of the second microchannel reactor was 3° C., and the residence time was 5 seconds. The gas-liquid mixture in the second microchannel reactor entered the second gas-liquid separator, and the gas separated by the second gas-liquid separator contained HCl and entrained HF, and the mixed gas entered a HF and HCl separation system through a pressurized device. The liquid separated by the second gas-liquid separator contained $LiPF_6$ in the original mother liquor, $LiPF_6$ produced by the new reaction and LiF that was not reacted completely. The mixed liquid was transported to the first microchannel reactor as a fourth feed stream. The synthetic liquid in the synthetic liquid tank was transported to a crystallization tank for crystallization of $LiPF_6$, and $LiPF_6$ was crystallized in a cooling state. In the crystallization tank, the cooling rate of the synthetic liquid was 2° C./h, the stirring rate of the stirrer was 50 rpm, the synthetic liquid was cooled from 20° C. to −45° C., and kept for 6 hours after cooled to −45° C. Then drying and acid removal was carried out in the drying system after solid crystallization and filtration, to obtain a $LiPF_6$ crystal. The filtered mother liquor was stored in the mother liquor tank. After the content of $LiPF_6$ in mother liquor in mother liquor tank was determined quantitatively, the mother liquor was conveyed to the LiF dissolution tank for the preparation of quantitative LiF solution. The HF solution containing $LiPF_6$ dissolved a certain amount of LiF and was transported to the second microchannel reactor for reaction to form the third feed stream. The molar ratio of PF5 to LiF in the first microchannel reactor was 2:1, and the molar ratio of PF5 to LiF in the second microchannel reactor was 1:1.

Figure 4:
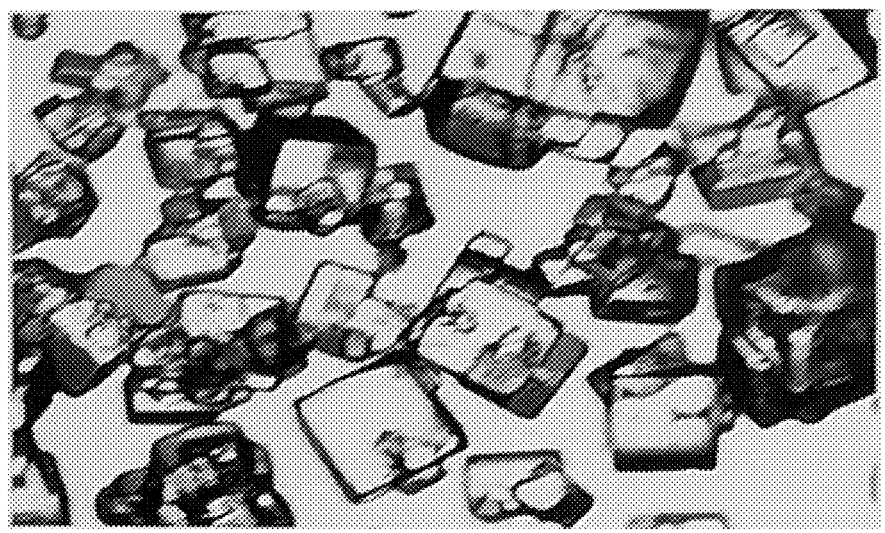
FIG. 4 is a SEM image of a mixture crystal containing $LiPF_6$ prepared in Example 3.1 and Example 5.1.
Figure 6:
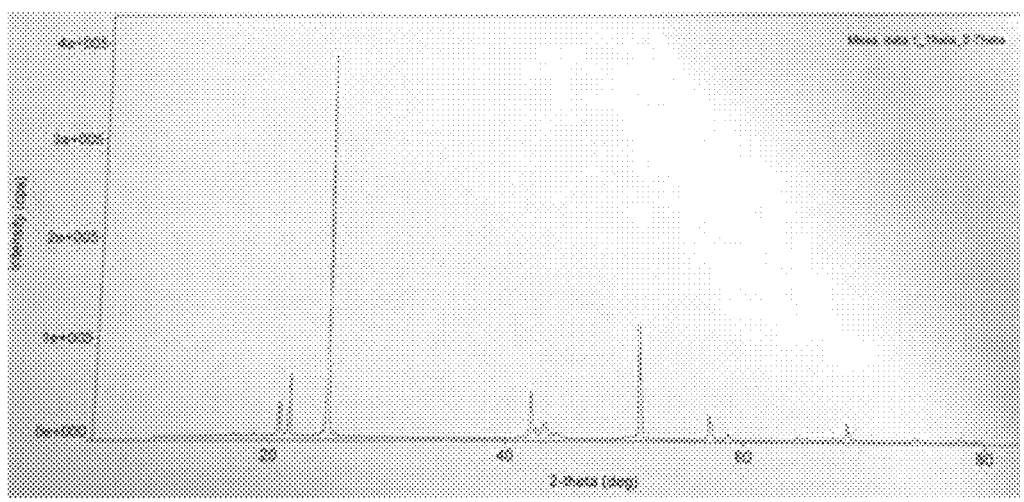
FIG. 6 is a XRD pattern of a mixture crystal containing $LiPF_6$ prepared in Example 3.1.

The specific performance parameters of the prepared crystal were shown in Table 2, the SEM image of the crystal was shown in FIG. 4, and the XRD pattern of the crystal was shown in FIG. 6.

Example 3.2

The mixture crystal containing $LiPF_6$ was prepared according to the steps and conditions of Example 3.1, except that the molar ratio of PF5 to LiF in the first microchannel reactor was 2.5:1, and the molar ratio of PF5 to LiF in the second microchannel reactor was 1:1.1.

The specific performance parameters of the prepared crystals were shown in Table 2.

Example 3.3

The mixture crystal containing $LiPF_6$ was prepared according to the steps and conditions of Example 3.1, except that the reaction temperature of the first microchannel reactor was 4° C., the residence time was 10 seconds, the reaction temperature of the second microchannel reactor was 6° C., and the residence time was 12 seconds.

The specific performance parameters of the prepared crystals were shown in Table 2.

Comparative Example 3.1

Figure 5:
FIG. 5 is a SEM image of a mixture crystal containing $LiPF_6$ prepared in Comparative Example 3.1.

The $LiPF_6$ crystal was prepared according to the steps and conditions of Example 3.1, with the difference that no second microchannel reactor was set, and the reaction was only carried out in the first microchannel reactor. The specific performance parameters of the prepared crystal were shown in Table 2, and the SEM image of the crystal was shown in FIG. 5.

microchannel reactor 3 to form a first feed stream. In the dissolution tank with cooling jacket and stirrer, HF was added, and LiF was added into the dissolution tank with a solid feeding device while cooling, and the dissolution temperature was controlled at about 0° C., and the mass fraction of LiF to be 3 wt %. The HF solution with dissolved LiF was pumped into the first microchannel reactor 3 to form a second feed stream. The reaction temperature of the first microchannel reactor 3 was 5° C., and the residence time was 10 seconds. The gas-liquid mixture material from the first microchannel reactor 3 entered the first gas-liquid separator 4, and the liquid in the first gas-liquid separator 4 was transported to the synthetic liquid tank 5 for storage, and the gases separated by the first gas-liquid separator included unreacted PF5, HCl and entrained HF. The mixed gas was transported to the second microchannel reactor 6 to react with the third feed stream containing $LiPF_6$, LiF and HF. The reaction temperature of the second microchannel reactor 6 was 5° C., and the residence time was 10 seconds. The gas-liquid mixture in the second microchannel reactor entered the second gas-liquid separator 7, and the gas separated by the second gas-liquid separator 7 contained HCl and entrained HF, and the mixed gas entered a HF and HCl separation system 8 through a pressurized device. The liquid separated by the second gas-liquid separator 7 con-

TABLE 2

| | Example 3.1 | Example 3.2 | Example 3.3 | Comparative Example 3.1 |
|---|---|---|---|---|
| Aspect ratio | 1-1.5 | 1-1.3 | 1-1.4 | 1-1.6 |
| Average particle size(mm) | 0.2 | 0.25 | 0.3 | 0.4 |
| Proportion of crystals with a particle size of 0.2-0.3 mm (wt) | 82% | 85% | 85% | 48% |
| Proportion of crystals with a particle size of 0.18-0.35 mm (wt) | 91% | 94% | 94% | 60% |
| Proportion of family of crystal planes {110} and family of crystal planes{111} accounting for 20-80% of the crystals (wt) respectively | 91% | 95% | 93% | 75% |
| Proportion of family of crystal planes {110} and family of crystal planes{111} accounting for 40-60% of the crystals (wt) respectively | 80% | 88% | 85% | 67% |
| Angle of repose | 38° | 20° | 25° | 45° |
| Bulk density (g/mL) | 1.35 | 1.8 | 1.7 | 1.2 |
| Mass percentage of $LiPF_6$ | 99.99% | 99.995% | 99.995% | 99.89% |
| Yield | 99.6% | 99.8% | 99.85% | 98% |
| Insoluble substances (ppm) | 70 | 18 | 20 | 200 |
| Free acid (calculated as HF) (ppm) | 20 | 5 | 5 | 100 |
| Capacity retention rate for 500 cycles | 89.32% | 90.12% | 90.02% | 88.16 |
| Capacity retention rate under 6 C high-rate charge-discharge conditions | 92.51% | 93.91% | 93.61% | 89.56 |

Example 4.1

Referring to FIG. 1, the water content in anhydrous HF was reduced to 8 ppm using the F2 foaming method. The foaming time was 2 hours, the temperature was −20° C., and the F2 flow was 20 g/hr. PCl5 was transported to a PF5 generator 2 with a cooling jacket that stored anhydrous HF through a solid conveyor 1 with a metering device, and the temperature was controlled to be about 0° C. PCl5 reacted with anhydrous HF to produce PF5 and HCL. The mixed gas PF5, HCl and entrained HF gas were introduced into a first tained $LiPF_6$ in the original mother liquor, $LiPF_6$ produced by the new reaction and LiF that was not reacted completely. The mixed liquid was transported to the first microchannel reactor 3 as a fourth feed stream. The synthetic liquid in the synthetic liquid tank 5 was transported to a crystallization tank 9 for crystallization of $LiPF_6$, and $LiPF_6$ was crystallized in a cooling state. In the crystallization tank 9, the cooling rate of the synthetic liquid was 2° C./h, the stirring rate of the stirrer was 50 rpm, the synthetic liquid was cooled from 25° C. to −45° C., and kept for 6 hours after cooled to −45° C. Then drying and acid removal was carried out in the drying system 10 after solid crystallization and filtration, to obtain a LiPF$_6$ crystal. The filtered mother liquor was stored in the mother liquor tank 11. After the content of LiPF$_6$ in mother liquor in mother liquor tank 11 was determined quantitatively, the mother liquor was conveyed to the LiF dissolution tank 12 for the preparation of quantitative LiF solution. The HF solution containing LiPF$_6$ dissolved a certain amount of LiF and was transported to the second microchannel reactor 6 for reaction to form the third feed stream. The molar ratio of PF5 to LiF in the first microchannel reactor was 2:1, and the molar ratio of PF5 to LiF in the second microchannel reactor was 1:1.

After testing, in the resulting composition, the content of LiPF$_6$ crystal was 99.995%, the yield was 99.8%, the particle size of 41% crystals was greater than or equal to 0.2 mm and less than 0.25 mm, and the particle size of 42% crystals was greater than or equal to 0.25 mm and less than or equal to 0.3 mm, the water content was 3 ppm. The water content was determined by the method specified in GB/T 19282-2014.

Example 4.2

The production process of this example different from Example 4.1 was as follows: Heat treatment was performed after drying and acid removal in the drying system, and the dried product was supplied to a heating furnace. The interior of the heating furnace was vacuumized and sealed with PF5 gas, the heating time was 2 hours, the temperature was 98° C., the pressure was atmospheric pressure, after cooled to room temperature, the interior of the container was vacuumized to obtain the composition. After testing, in the generated composition, the content of the LiPF$_6$ crystal was 99.9952%, the water content was 2 ppm, the particle size of 45% crystals was greater than or equal to 0.2 mm and less than 0.25 mm, and the particle size of 45% crystals was greater than or equal to 0.25 mm and less than or equal to 0.3 mm.

Comparative Example 4.1

The production process of this comparative example different from Example 4.1 was as follows: the first feed stream introducing into the first microchannel reactor was purified PF5 gas. No second microchannel reactor was set. The molar ratio of PF5 to LiF in the first microchannel reactor was 1.5:1. After testing, in the resulting composition, the content of the LiPF$_6$ crystal was 99.88%, the yield was 98.5%, the particle size of 34% crystals was greater than or equal to 0.2 mm and less than 0.25 mm, and the particle size of 29% crystals was greater than or equal to 0.25 mm and less than or equal to 0.3 mm. The water content was 9 ppm.

Comparative Example 4.2

The production process of this comparative example different from Example 4.1 was as follows: the first and second microchannel reactors were replaced by the first and second reactors, respectively. After being replaced with reactors, for batch production, the reaction time of the first and second reactors increased to 8 hours.

After testing, in the resulting composition, the content of the LiPF$_6$ crystal was 99.75%, the yield was 96.1%, the particle size of 31% crystals was greater than or equal to 0.2 mm and less than 0.25 mm, and the particle size of 23% crystals was greater than or equal to 0.25 mm and less than or equal to 0.3 mm. The water content was 10 ppm.

Instructions for Examples 5.1 to 5.14

The preparation method of LiPF$_6$ mixture crystal used in Examples 5.1 to 5.14:

PCl5 was transported to a PF5 generator with a cooling jacket that stored HF through a solid conveyor with a metering device, and the temperature was controlled to be about 0° C. PCl5 reacted with HF to produce PF5 and HCl. The mixed gas PF5, HCl and entrained HF gas were introduced into a first microchannel reactor to form a first feed stream. In the dissolution tank with cooling jacket and stirrer, HF was added, and LiF was added into the dissolution tank with a solid feeding device while cooling, and the dissolution temperature was controlled at about 0° C., and the mass fraction of LiF to be 2 wt %. The HF solution with dissolved LiF was pumped into the first microchannel reactor to form a second feed stream. The reaction temperature of the first microchannel reactor was 3° C., and the residence time was 5 seconds. The gas-liquid mixture material from the first microchannel reactor entered the first gas-liquid separator, and the liquid in the first gas-liquid separator was transported to the synthetic liquid tank for storage, and the gases separated by the first gas-liquid separator included unreacted PF5, HCl and entrained HF. The mixed gas was transported to the second microchannel reactor to react with the third feed stream containing LiPF$_6$, LiF and HF. The reaction temperature of the second microchannel reactor was 3° C., and the residence time was 5 seconds. The gas-liquid mixture in the second microchannel reactor entered the second gas-liquid separator, and the gas separated by the second gas-liquid separator contained HCl and entrained HF, and the mixed gas entered a HF and HCl separation system through a pressurized device. The liquid separated by the second gas-liquid separator contained LiPF$_6$ in the original mother liquor, LiPF$_6$ produced by the new reaction and LiF that was not reacted completely. The mixed liquid was transported to the first microchannel reactor as a fourth feed stream. The synthetic liquid in the synthetic liquid tank was transported to a crystallization tank for crystallization of LiPF$_6$, and LiPF$_6$ was crystallized in a cooling state. In the crystallization tank, the cooling rate of the synthetic liquid was 2° C./h, the stirring rate of the stirrer was 50 rpm, the synthetic liquid was cooled from 20° C. to −45° C., and kept for 6 hours after cooled to −45° C. Then drying and acid removal was carried out in the drying system after solid crystallization and filtration, to obtain a LiPF$_6$ crystal. The filtered mother liquor was stored in the mother liquor tank. After the content of LiPF$_6$ in mother liquor in mother liquor tank was determined quantitatively, the mother liquor was conveyed to the LiF dissolution tank for the preparation of quantitative LiF solution. The HF solution containing LiPF$_6$ dissolved a certain amount of LiF and was transported to the second microchannel reactor for reaction to form the third feed stream. The molar ratio of PF5 to LiF in the first microchannel reactor was 2:1, and the molar ratio of PF5 to LiF in the second microchannel reactor was 1:1.

Example 5.1

The LiPF$_6$ mixture crystal was added to the organic solvent of ethylene carbonate, ethyl methyl carbonate and diethyl carbonate in a volume ratio of 2:4:4; in the prepared non-aqueous electrolyte solution, the concentration of LiPF$_6$ was 1.2 mol/L, after mixed and dissolved, the aspect ratio of the LiPF$_6$ mixture crystal was 1-1.5, the average particle size was 0.2 mm, and among the 80% (wt) of the crystal particles, the family of crystal planes{110} accounted for 40-60%, and the family of crystal planes{111} accounted for 40-60%; among 91% (wt) of the crystal particles, the family of crystal planes{110} accounted for 20-80%, the family of crystal planes{111} accounted for 20-80%, and the average particle size of 82% (wt) of the mixture crystal was 0.2-0.3 mm, the average particle size of 91% (wt) of the mixture crystal was 0.18-0.35 mm; the angle of repose of the mixture crystal was 38°, the bulk density was 1.35 g/mL, the mass percentage of LiPF$_6$ in the mixture crystal was 99.99%; relative to 100% (wt) of the electrolyte solution, the additive was added in an amount of 2% (wt). The additives were lithium difluorophosphate, lithium bis(trifluoromethanesulphonyl) imide and fluorocarbonate, and the weight ratio thereof was 1:1:3, wherein fluorocarbonate was a mixture of fluoroethylene carbonate and trifluoropropylene carbonate in a weight ratio of 1:2, which was used to prepare a non-aqueous electrolyte solution for secondary batteries.

Example 5.2

The non-aqueous electrolyte solution was prepared according to the steps and conditions of Example 5.1, except that the organic solvent was ethylene carbonate and ethyl methyl carbonate in a volume ratio of 1:4.

Example 5.3

The non-aqueous electrolyte solution was prepared according to the steps and conditions of Example 5.1, except that no additive was used.

Example 5.4

The non-aqueous electrolyte solution was prepared according to the steps and conditions of Example 5.1, except that the amount of the additive was 5%.

Example 5.5

The non-aqueous electrolyte solution was prepared according to the steps and conditions of Example 5.1, except that the additive was lithium difluorophosphate.

Example 5.6

The non-aqueous electrolyte solution was prepared according to the steps and conditions of Example 5.1, except that the additives were lithium difluorophosphate and lithium bis(trifluoromethanesulphonyl)imide in a weight ratio of 1:1.

Example 5.7

The non-aqueous electrolyte solution was prepared according to the steps and conditions of Example 5.1, except that the additives were lithium difluorophosphate, lithium bis(trifluoromethanesulphonyl)imide, fluorocarbonate and bis(4-fluorophenyl) sulfone in a weight ratio of 1:1:3:0.5.

Example 5.8

The non-aqueous electrolyte solution was prepared according to the steps and conditions of Example 5.1, except that the additives were lithium difluorophosphate, lithium bis(trifluoromethanesulphonyl)imide, fluorocarbonate and LiF in a weight ratio of 1:1:3:0.5.

Example 5.9

The non-aqueous electrolyte solution was prepared according to the steps and conditions of Example 5.1, except that the additives were lithium difluorophosphate, lithium bis(trifluoromethanesulphonyl)imide, fluorocarbonate, bis (4-fluorophenyl) sulfone and LiF in a weight ratio of 1:1: 3:0.5:0.5.

Example 5.10

The non-aqueous electrolyte solution was prepared according to the steps and conditions of Example 5.1, except that the fluorocarbonate was fluoroethylene carbonate.

Example 5.11

The non-aqueous electrolyte solution was prepared according to the steps and conditions of Example 5.1, except that the organic solvents were propylene carbonate, vinylene carbonate, methyl propyl carbonate, dipropyl carbonate in a volume ratio of 1:2:1.1:2.5, and the concentration of LiPF$_6$ was 0.9 mol/L.

Example 5.12

The non-aqueous electrolyte solution was prepared according to the steps and conditions of Example 5.1, except that the volume ratio of ethylene carbonate, vinylene carbonate, ethyl methyl carbonate and diethyl carbonate was 1:1:6:6.

Example 5.13

The non-aqueous electrolyte solution was prepared according to the steps and conditions of Example 5.1, except that the concentration of LiPF$_6$ was 1.4 mol/L.

Example 5.14

The non-aqueous electrolyte solution was prepared according to the steps and conditions of Example 5.1, except that the concentration of LiPF$_6$ was 1.6 mol/L.

Comparative Example 5.1

The non-aqueous electrolyte solution was prepared according to the steps and conditions of Example 5.1, except that the amount of the additive was 6%.

Comparative Example 5.2

The non-aqueous electrolyte solution was prepared according to the steps and conditions of Example 5.1. The difference was that the aspect ratio of the LiPF$_6$ mixture crystal was 0.7-1.3, the average particle size was 0.2 mm, and among 70% (wt) of the crystal particles, the family of crystal planes {110} accounted for 40-60%, the family of crystal planes{111} accounted for 40-60%; among 80% (wt) of the crystal particles, the family of crystal planes{110} accounted for 20-80%, the family of crystal planes{111} accounted for 20-80%, and the average particle size of 45% (wt) of the mixture crystal was 0.2-0.3 mm, the average particle size of 62% (wt) of the mixture crystal was 0.18-

0.35 mm, and the angle of repose of the mixture crystal was 18°, the bulk density was 1.3 g/mL.

Comparative Example 5.3

The non-aqueous electrolyte solution was prepared according to the steps and conditions of Example 5.1. The difference was that the aspect ratio of the $LiPF_6$ mixture crystal was 0.6-0.9, the average particle size was 0.11 mm, and among 55% (wt) of the crystal particles, the family of crystal planes {110} accounted for 40-60%, the family of crystal planes {111} accounted for 40-60%; among 70% (wt) of the crystal particles, the family of crystal planes {110} accounted for 20-80%, the family of crystal planes {111} accounted for 20-80%, and the average particle size of 35% (wt) of the mixture crystal was 0.2-0.3 mm, the average particle size of 50% (wt) of the mixture crystal was 0.18-0.35 mm, and the angle of repose of the mixture crystal was 15°, the bulk density was 1.2 g/mL.

The secondary lithium batteries in Examples 5.1 to 5.14 and Comparative Examples 5.1 to 5.3 were prepared as follows.

(1) Preparation of Positive Electrode Sheet

The lithium nickel-cobalt-manganese ternary material $LiNi_{0.5}Co_{0.2}Mn_{0.3}O_2$, the binder polyvinylidene fluoride and the conductive agent acetylene black were mixed in a mass ratio of 97:1.5:2, and N-methylpyrrolidone (NMP) was added to mix and stir evenly, to obtain positive electrode slurry; the positive electrode slurry was uniformly coated on the aluminum foil, positive electrode current collector, with a thickness of 14 m; the aluminum foil was dried at room temperature and baked to dryness, and then cold-pressed and cut to obtain a positive electrode sheet.

(2) Preparation of Negative Electrode Sheet

The negative electrode active materials (artificial graphite, carbon black, and the binder polyvinylidene fluoride) were mixed in a mass ratio of 98:1:1, and N-methylpyrrolidone (NMP) was added to mix and stir evenly, to obtain negative electrode slurry. The slurry was uniformly coated on the copper foil, negative electrode current collector, with a thickness of 8 m; the copper foil is dried at room temperature and baked to dryness, and then cold-pressed and cut to obtain a negative electrode sheet.

(3) Preparation of Separator

Polyethylene with a thickness of 12 m was used as a separator.

(4) Preparation of Secondary Lithium Battery

The positive electrode sheet, separator, and negative electrode sheet were stacked in sequence, and then rolled into a square bare battery cell, put into aluminum plastic film, then dried, injected with corresponding electrolyte solution and sealed, after the processes of standing, hot and cold pressing, pre-forming, clamping and divided capacity, etc., the secondary lithium battery was obtained.

Test Example

In the following test examples, the performance of batteries prepared in Example 5.1 to 5.14 and Comparative Example 5.1 to 5.3 was tested. Results were shown in Table 3.

(1) High Temperature Storage Performance Test of Secondary Lithium Battery

At room temperature of 25° C., the secondary lithium battery was charged with a constant current of 1C to a voltage of 4.2V, further charged with a constant voltage of 4.2V to a current of 0.05C, allowed to standing for 10 minutes, then discharged with a constant current of 1C to a voltage of 2.75V to measure the initial discharge capacity. After that, the secondary battery was charged to a voltage of 4.2V at a room temperature of 25° C. with a constant current of 1C, further charged with a constant voltage of 4.2V until a current of 0.05C, and then stored at 60° C. for 4 weeks. Subsequently, it was charged with a constant current of 1C to a voltage of 4.2V, further charged with a constant voltage of 4.2V to a current of 0.05C, allowed to standing for 10 minutes, then discharged with a constant current of 1C to a voltage of 2.75V, to measure the discharge capacity after storage, and calculate the capacity retention rate.

Capacity retention rate (%)=[Discharge capacity after 4 weeks of storage/initial discharge capacity]×100.

(2) High Temperature Cycle Performance Test of Secondary Lithium Battery

At 60° C., the secondary lithium battery was charged with a constant current of 1C to a voltage of 4.2V, further charged with a constant voltage of 4.2V to a current of 0.05C, allowed to standing for 10 minutes, then discharged with a constant current of 1C to 2.75V; this was a charge-discharge cycle process. The discharge capacity this time was the initial discharge capacity of the secondary lithium battery. The secondary lithium battery was subjected to 500-cycle charging/discharging test according to the above method, to obtain the capacity retention rate after 500 cycles at 60° C.

Capacity retention rate (%)=(Discharge capacity after 500 cycles/Initial discharge capacity)×100%.

(3) High-Rate Charging Performance Test of Secondary Lithium Battery

At room temperature of 25° C., the secondary lithium battery was charged with a constant current rate of 1C to a voltage of 2.75V, after standing for 10 minutes, charged to 4.2V with a constant current rate of 0.5C, after standing for 10 minutes, discharged to 2.75V with a constant current rate of 1C, to obtain the charging capacity under 0.5C rate charging.

At 25° C., the secondary lithium battery was charged with a constant current rate of 1C to a voltage of 2.75V, after standing for 10 minutes, charged to 4.2V with a constant current rate of 5C, after standing for 10 minutes, discharged to 2.75V with a constant current rate of 1C, to obtain the charging capacity under 5C rate charging.

The charging capacity ratio (%) of the secondary lithium battery under 5C rate charging=Charging capacity under 5C rate charging/Charging capacity under 0.5C rate charging×100%.

(4) Low-Temperature Discharge Performance Test of Secondary Lithium Battery

At 25° C., the secondary lithium battery was charged with a constant current of 1C to a voltage of 4.2V, further charged with a constant voltage of 4.2V to a current of 0.05C, allowed to standing for 10 minutes, after standing for 4 h under different temperatures (25° C., 0° C., −10° C.), discharged with a constant current of 1C to 2.75V; after the end of discharging, allowed to standing for 5 minutes, and the discharge capacity of the secondary lithium battery was recorded at this time.

Discharge capacity ratio (%) of the secondary lithium battery at different temperatures=(Discharge capacity at 0° C.,−10° C.)/(Discharge capacity at 25° C.)×100.

Table 3 showed the performance test results of Example 5.1 to 5.14 and Comparative Example 5.1 to 5.3.

TABLE 3

| | Capacity retention rate/% after 4 weeks of storage at | Capacity retention rate after 500 cycles at | Charge capacity ratio under 5 C rate | Discharge capacity ratio at different temperatures | |
|---|---|---|---|---|---|
| | 60° C. | 60° C./% | charging/% | 0° C. | −10° C. |
| Example 5.1 | 97.33% | 91.67% | 90.67% | 94.12% | 82.32% |
| Example 5.2 | 91.21% | 87.45% | 87.59% | 89.67% | 77.54% |
| Example 5.3 | 90.15% | 85.79% | 84.24% | 86.54% | 76.66% |
| Example 5.4 | 95.35% | 90.64% | 89.36% | 92.67% | 80.95% |
| Example 5.5 | 91.57% | 87.96% | 85.95% | 87.36% | 77.82% |
| Example 5.6 | 94.54% | 89.01% | 88.01% | 91.37% | 81.21% |
| Example 5.7 | 98.42% | 92.62% | 91.43% | 95.14% | 83.54% |
| Example 5.8 | 98.22% | 92.72% | 91.55% | 95.47% | 83.68% |
| Example 5.9 | 98.97% | 93.01% | 92.11% | 96.34% | 84.78% |
| Example 5.10 | 95.42% | 90.21% | 88.56% | 92.01% | 80.95% |
| Example 5.11 | 96.84% | 91.54% | 90.63% | 93.67% | 82.24% |
| Example 5.12 | 94.36% | 89.64 | 86.56% | 89.12% | 80.32% |
| Example 5.13 | 96.89% | 92.01% | 89.67% | 92.86% | 81.88% |
| Example 5.14 | 93.11% | 89.21% | 86.76% | 90.36% | 79.42% |
| Comparative Example 5.1 | 78.67% | 79.23% | 75.33% | 80.45% | 70.21% |
| Comparative Example 5.2 | 80.15% | 78.35% | 79.43% | 77.64% | 71.06% |
| Comparative Example 5.3 | 70.31% | 68.54% | 69.65% | 70.52% | 60.85% |

As shown in the above Table 3, the lithium battery prepared by using the $LiPF_6$ mixture crystal of the present invention as a non-aqueous electrolyte solution of lithium salt had excellent high-temperature cycle performance, high-temperature storage performance, low-temperature discharge performance, and high-rate charging performance. By adding the specific additive and organic solvent of the present invention, the above performance of the secondary lithium battery was obviously improved.

Instructions of Examples 6.1 to 6.3

The $LiPF_6$ used in Examples 6.1 to 6.3 of the present invention was prepared in Example 4.1.

Example 6.1

A fluorine-containing electrolyte solution comprised $LiPF_6$, $LiPO_2F_2$, $LiBF_2C_2O_4$, ethylene carbonate, ethyl methyl carbonate and diethyl carbonate. The purity of $LiPF_6$ used in the preparation of the electrolyte solution was 99.995 wt %, the water content was 3 ppm, 41% of the crystal particle size was greater than or equal to 0.2 mm and less than 0.25 mm, and 42% of the crystal particle size was greater than or equal to 0.25 mm and less than or equal to 0.3 mm. The water content was determined by the method in GB/T 19282-2014. In the fluorine-containing electrolyte solution, the mass fraction of $LiPF_6$ was 18 wt %, the mass fraction of $LiPO_2F_2$ was 1 wt %, the mass fraction of $LiBF_2C_2O_4$ was 1 wt %, the mass fraction of ethylene carbonate was 24 wt %, the mass fraction of ethyl methyl carbonate was 41 wt %, and the mass fraction of diethyl carbonate was 15 wt %.

After testing, the conductivity of fluorine-containing electrolyte solution was 10.07 mS/cm at 25° C. The capacity retention rate of the assembled LiCoO2/graphite full battery after 500 cycles under 0.5C rate at a cut-off voltage of 3.0-4.4 V was tested at 25° C., and the result was 90.5%.

Example 6.2

A fluorine-containing electrolyte solution comprised $LiPF_6$, $LiPO_2F_2$, $LiBF_2C_2O_4$, 1,2-Bis(trifluoromethyl)benzene, ethylene carbonate, ethyl methyl carbonate R diethyl carbonate. The purity of $LiPF_6$ used in the preparation of the electrolyte solution was 99.995 wt %, the water content was 3 ppm, 41% of the crystal particle size was greater than or equal to 0.2 mm and less than 0.25 mm, and 42% of the crystal particle size was greater than or equal to 0.25 mm and less than or equal to 0.3 mm. The water content was determined by the method in GB/T 19282-2014. In the fluorine-containing electrolyte solution, the mass fraction of $LiPF_6$ was 18 wt %, the mass fraction of $LiPO_2F_2$ was 1 wt %, the mass fraction of $LiBF_2C_2O_4$ was 1 wt %, the mass fraction of 1,2-Bis(trifluoromethyl)benzene was 3 wt %, the mass fraction of ethylene carbonate was 24 wt %, the mass fraction of ethyl methyl carbonate was 38 wt %, and the mass fraction of diethyl carbonate was 15 wt %.

After testing, the conductivity of fluorine-containing electrolyte solution was 10.42 mS/cm at 25° C. The capacity retention rate of the assembled LiCoO2/graphite full battery after 500 cycles under 0.5C rate at a cut-off voltage of 3.0-4.4 V was tested at 25° C., and the result was 91.6%.

Example 6.3

A fluorine-containing electrolyte solution comprised $LiPF_6$, $LiPO_2F_2$, $LiBF_2C_2O_4$, 1,2-Bis(trifluoromethyl)benzene, ethylene carbonate, ethyl methyl carbonate, diethyl carbonate, diethyl ether, trifluoromethyl ethyl sulfone. The purity of $LiPF_6$ used in the preparation of the electrolyte solution was 99.995 wt %, the water content was 3 ppm, 41% of the crystal particle size was greater than or equal to 0.2 mm and less than 0.25 mm, and 42% of the crystal particle size was greater than or equal to 0.25 mm and less than or equal to 0.3 mm. The water content was determined by the method in GB/T 19282-2014. In the fluorine-containing electrolyte solution, the mass fraction of $LiPF_6$ was 12 wt %, the mass fraction of $LiPO_2F_2$ was 3 wt %, the mass fraction of $LiBF_2C_2O_4$ was 2 wt %, the mass fraction of 1,2-Bis(trifluoromethyl)benzene was 2 wt %, the mass fraction of ethylene carbonate was 20 wt %, the mass fraction of ethyl methyl carbonate was 38 wt %, and the mass fraction of diethyl carbonate was 13 wt %, the mass fraction of diethyl ether was 5 wt %, the mass fraction of trifluoromethyl ethyl sulfone was 5 wt %.

After testing, the conductivity of fluorine-containing electrolyte solution was 10.85 mS/cm at 25° C. The capacity retention rate of the assembled LiCoO2/graphite full battery after 500 cycles under 0.5C rate at a cut-off voltage of 3.0-4.4 V was tested at 25° C., and the result was 92.8%.

Comparative Example 6.1

The differences between this comparative example and Example 6.1 were as follows: the purity of $LiPF_6$ used in the preparation of the electrolyte solution was 99.89 wt %, the water content was 20 ppm, 28% of the crystal particle size was greater than or equal to 0.2 mm and less than 0.25 mm, 23% of the crystal particle size was greater than or equal to 0.25 mm and less than or equal to 0.3 mm. The water content was determined by the method in GB/T 19282-2014.

After testing, the conductivity of fluorine-containing electrolyte solution was 8.77 mS/cm at 25° C. The capacity retention rate of the assembled LiCoO2/graphite full battery after 500 cycles under 0.5C rate at a cut-off voltage of 3.0-4.4 V was tested at 25° C., and the result was 86.5%.

Comparative Example 6.2

The difference between this comparative example and Example 6.1 was as follows: 1,2-Bis(trifluoromethyl)benzene was replaced by benzotrifluoride. After testing, the conductivity of fluorine-containing electrolyte solution was 9.56 mS/cm at 25° C. The capacity retention rate of the assembled LiCoO2/graphite full battery after 500 cycles under 0.5C rate at a cut-off voltage of 3.0-4.4 V was tested at 25° C., and the result was 88.6%.

The invention claimed is:

1. A fluorine-containing electrolyte solution, comprising $LiPF_6$, the $LiPF_6$ used in the preparation of the fluorine-containing electrolyte solution is $LiPF_6$ with 68% (wt) or more of the particle size greater than or equal to 0.2 mm and less than or equal to 0.3 mm, the water content of the $LiPF_6$ is lower than 6 ppm, the purity of $LiPF_6$ is above 99.99%, and the mass percentage of $LiPF_6$ in the fluorine-containing electrolyte solution is 5-20 wt %.

2. The fluorine-containing electrolyte solution according to claim 1, wherein the particle size of the $LiPF_6$ crystal used in the preparation of the fluorine-containing electrolyte solution is uniformly distributed, and 30-50% of the crystal particle size is greater than or equal to 0.2 mm and less than 0.25 mm, and 30-50% of the crystal particle size is greater than or equal to 0.25 mm and less than or equal to 0.3 mm.

3. The fluorine-containing electrolyte solution according to claim 2, wherein the particle size of the $LiPF_6$ crystal used in the preparation of the fluorine-containing electrolyte solution is uniformly distributed, and 40-50% of the crystal particle size is greater than or equal to 0.2 mm and less than 0.25 mm, and 40-50% of the crystal particle size is greater than or equal to 0.25 mm and less than or equal to 0.3 mm.

4. The fluorine-containing electrolyte solution according to claim 1, wherein the fluorine-containing electrolyte solution further comprises at least one of $LiPO_2F_2$, $LiBF_2C_2O_4$, $LiBF_4$, $LiPF_6$, LiFSI, LiTFSI, $LiAsF_6$, $LiClO_4$, $LiSO3CF_3$, $LiC_{2O4}BC_2O_4$, $LiF_2BC_2O_4$, $LiPO_2F_2$, $LiPF_2$, $LiPF_4C_2O_4$ and $LiPF_2C_4O_8$, and the mass percentage thereof in the electrolyte solution is 0.1-5 wt %.

5. The fluorine-containing electrolyte solution according to claim 4, wherein the fluorine-containing electrolyte solution comprises $LiPO_2F_2$ and $LiBF_2C_2O_4$.

6. The fluorine-containing electrolyte solution according to claim 4, wherein the fluorine-containing electrolyte solution further comprises 1,2-Bis(trifluoromethyl)benzene, and the mass percentage of 1,2-Bis(trifluoromethyl)benzene in the fluorine-containing electrolyte solution is 0.1-3 wt %.

7. The fluorine-containing electrolyte solution according to claim 1, wherein the fluorine-containing electrolyte solution comprises ethylene carbonate, ethyl methyl carbonate and diethyl carbonate, and the total mass percentage of ethylene carbonate, ethyl methyl carbonate and diethyl carbonate in the fluorine-containing electrolyte solution is 70-90 wt %, and the mass ratio of ethylene carbonate, ethyl methyl carbonate and diethyl carbonate is (2.5-3.5):(4.5-5.5):(1.5-2.5).

8. The fluorine-containing electrolyte solution according to claim 1, wherein $LiPF_6$ is $LiPF_6$ prepared by using two microchannel reactors.

* * * * *